US008373697B2

(12) United States Patent
Takahashi et al.

(10) Patent No.: US 8,373,697 B2
(45) Date of Patent: Feb. 12, 2013

(54) GRADATION CONVERTING DEVICE, IMAGE PROCESSING APPARATUS, IMAGE PROCESSING METHOD, AND COMPUTER PROGRAM

(75) Inventors: Naomasa Takahashi, Chiba (JP); Ayataka Nishio, Kanagawa (JP); Jun Hirai, Tokyo (JP); Makoto Tsukamoto, Kanagawa (JP)

(73) Assignee: Sony Corporation (JP)

( * ) Notice: Subject to any disclaimer, the term of this patent is extended or adjusted under 35 U.S.C. 154(b) by 669 days.

(21) Appl. No.: 12/322,822

(22) Filed: Feb. 6, 2009

(65) Prior Publication Data

US 2009/0201516 A1 Aug. 13, 2009

(30) Foreign Application Priority Data

Feb. 8, 2008 (JP) ................................ 2008-028470

(51) Int. Cl.
*G06F 17/00* (2006.01)
*G06K 9/00* (2006.01)
*G06K 9/40* (2006.01)
*G06K 9/38* (2006.01)

(52) U.S. Cl. ........ 345/418; 345/214; 345/694; 345/698; 382/260; 359/9

(58) Field of Classification Search .................. 345/418; 382/232–280
See application file for complete search history.

(56) References Cited

U.S. PATENT DOCUMENTS 6,847,737 B1 * 1/2005 Kouri et al. ................... 382/260
7,292,733 B2 * 11/2007 Monobe et al. ............... 382/261
7,944,464 B2 * 5/2011 Fukushima et al. ............ 348/51
2002/0054354 A1 5/2002 Fukao
2005/0259884 A1 * 11/2005 Murakami et al. ............ 382/252

FOREIGN PATENT DOCUMENTS

JP 61-201575 A 9/1986
JP 4-040071 A 2/1992
JP 4-356869 A 12/1992

(Continued)

OTHER PUBLICATIONS

Eurpoean Search Report, EP 09152148, dated May 11, 2009.

(Continued)

*Primary Examiner* — David T Welch
*Assistant Examiner* — Matthew D Salvucci
(74) *Attorney, Agent, or Firm* — Lerner, David, Littenberg, Krumholz & Mentlik, LLP

(57) ABSTRACT

An image processing apparatus includes: a filter-coefficient storing unit that stores filter coefficients respectively associated with spatial frequencies, which are the numbers of strips displayed per unit angle with respect to an angle of field of a display apparatus; a viewing-condition determining unit that determines, as viewing conditions, a viewing distance between a viewer and the display apparatus and pixel density of the display apparatus; a filter-coefficient setting unit that sets a filter coefficient selected on the basis of a spatial frequency calculated from the viewing conditions among the stored filter coefficients; and a gradation modulating unit including a quantizing unit that quantizes a pixel value in a predetermined coordinate position in an image signal and outputs the pixel value as a quantized pixel value in the predetermined coordinate position, the gradation modulating unit gradation-modulating the image signal by multiply-accumulating a set filter coefficient with respect to quantization errors caused by the quantizing unit to feedback the quantization errors to an input side of the quantizing unit.

16 Claims, 24 Drawing Sheets

FOREIGN PATENT DOCUMENTS

| | | | |
|---|---|---|---|
| JP | 05-103204 | A | 4/1993 |
| JP | 7-312688 | A | 11/1995 |
| JP | 8-032900 | A | 2/1996 |
| JP | 9-321987 | A | 12/1997 |
| JP | 11-239275 | A | 8/1999 |
| JP | 2001-257880 | A | 9/2001 |
| JP | 2002-221950 | A | 8/2002 |
| JP | 2002-281306 | A | 9/2002 |
| JP | 2003-044847 | A | 2/2003 |
| WO | 9921356 | | 4/1999 |

OTHER PUBLICATIONS

Girod B et al: "A Subjective Evaluation of Noise-Shaping Quantization for Adaptive Intra-/Interframe DPCM Coding of Color Television Signals" IEEE Transactions on Communications, IEEE Service Center, Piscataway, NJ, US, vol. 36, No. 3, (Mar. 1, 1988), pp. 332-346.

Kolpatzik B W et al: "Optimized Error Diffusion for Image Display" Journal of Electronic Imaging, SPIE / IS &T, vol. 1, No. 3 (Jul. 1, 1992), pp. 277-292.

* cited by examiner

FIG. 11A

| | 521 | 522 |
|---|---|---|
| PIXEL DENSITY (NUMBER OF PIXELS) \ VIEWING DISTANCE | 2.5V | 3V |
| 511 V/1080 (1920 x 1080) | 25cpd | 30cpd |
| 512 V/768 (1365 x 768) | 19cpd | 23cpd |
| 513 V/720 (1280 x 720) | 18cpd | 21cpd |
| ⋮ | ⋮ | ⋮ |

FIG. 11B

| SPATIAL FREQUENCY | FILTER COEFFICIENT |
|---|---|
| 531 30cpd | $G_{30}$ : $g_{30}(1,1)$、$g_{30}(1,2)$、 ··· 、$g_{30}(5,1)$、$g_{30}(5,2)$ |
| 532 25cpd | $G_{25}$ : $g_{25}(1,1)$、$g_{25}(1,2)$、 ··· 、$g_{25}(5,1)$、$g_{25}(5,2)$ |
| 533 23cpd | $G_{23}$ : $g_{23}(1,1)$、$g_{23}(1,2)$、 ··· 、$g_{23}(5,1)$、$g_{23}(5,2)$ |
| ⋮ | ⋮ |

FIG. 12

| | PIXEL DENSITY (NUMBER OF PIXELS) \ VIEWING DISTANCE | 2.5V (551) | 3V (552) |
|---|---|---|---|
| 541 | V/1080 (1920 x 1080) | $G_{25}$ | $G_{30}$ |
| 542 | V/768 (1365 x 768) | $G_{19}$ | $G_{23}$ |
| 543 | V/720 (1280 x 720) | $G_{18}$ | $G_{21}$ |
| | ⋮ | ⋮ | ⋮ |

*FIG. 19*

781 782 783 784

| MANUFACTURER NAME | MANUFACTURING NUMBER | NUMBER OF PIXELS | SCREEN SIZE |
|---|---|---|---|
| MANUFACTURER A | ABC-XXXXX | 1920 x 1080 | 50inch |
| | XYZ-XXXXX | 1920 x 1080 | 37inch |
| MANUFACTURER B | CBA-ZZZZ | 1365 x 768 | 42inch |
| | ZYX-UUUU | 1280 x 1024 | 20inch |
| | AYZ-TTTT | 720 x 480 | 13inch |
| ⋮ | | ⋮ | |

GRADATION CONVERTING DEVICE, IMAGE PROCESSING APPARATUS, IMAGE PROCESSING METHOD, AND COMPUTER PROGRAM

CROSS-REFERENCE TO RELATED APPLICATIONS

The present application claims priority from Japanese Patent Application No. JP 2008-028470, filed in the Japanese Patent Office on Feb. 8, 2008, the entire content of which is incorporated herein by reference.

BACKGROUND OF THE INVENTION

1. Field of the Invention

The present invention relates to an image processing apparatus, and, more particularly to an image processing apparatus that quantizes pixel values of respective pixels of an image signal, a gradation converting device for the quantization, a processing method for the image processing apparatus and the gradation converting device, and a computer program for causing a computer to execute the method.

2. Description of the Related Art

In digital video display in digital camcorders, computer graphics, animations, and the like, the number of bits of a gradation of a material and the number of bits of a display apparatus or the number of bits on a digital transmission interface such as an HDMI (High-Definition Multimedia Interface) or a DVI (Digital Visual Interface) do not always coincide with each other. In signal processing in an apparatus that treats a digital video signal, a calculation process of the processing and the number of transmitted bits of video signal data in the apparatus may be different.

FIG. 20 is a block diagram of the numbers of bits of respective components and the number of bits on a bus until a digital image is displayed on a display apparatus. In FIG. 20, an image processing unit 811, a pixel-density converting unit 812, a color-mode converting unit 813, a panel control unit 814, and a display unit 815 are shown. An image signal inputted to the image processing unit 811 is sequentially processed and finally displayed on the display unit 815. In this case, it is seen that the numbers of bits of processing in the respective components and the numbers of bits of signal lines of the bus connecting the respective components are different. For example, whereas calculation in the panel control unit 814 is performed with 10 bits, an input signal to and an output signal from the panel control unit 814 are 8-bit RGB signals. The number of input and output signals and the number of bits of the internal calculation are different. In such a case, conversion of the number of bits is necessary as gradation conversion. As methods generally used for the conversion of the number of bits, there are bit shift for simply shifting the number of bits by a necessary number of bits and a method of, for example, once dividing the number of bits by the number of bits before conversion to normalize the number of bits to a value between 0 to 1 in order to expand quantization steps to equal interval and then multiplying the number of bits with a necessary number of bits.

FIG. 21 is a diagram of gradation conversion from 10 bits to 8 bits by the bit shift. In FIG. 21, 10-bit gradation representation 820 and 8-bit gradation representation 830 after the bit shift are shown. In this case, the number of bits is converted from 10 bits into 8 bits by moving 8 bits (higher order 8 bits) on the left to the right by 2 bits (omitting lower order 2 bits).

However, when the lower order 2 bits are omitted in this way, in an image with smooth gradation and a flat image with a little change of a gray scale such as an image of the blue sky in a sunny day, steps called banding or Mach band may appear because of the influence of the human visual characteristic.

Such quantization errors due to a reduction in the number of bits cause deterioration in an image quality. As measures against the quantization errors, in general, methods called a dither method and an error diffusion method are used. These methods are methods of adding PDM (Pulse Depth Modulation) noise to a boundary of the banding to thereby making the steps less conspicuous.

FIGS. 22A to 22C are graphs of a change in a pixel value that occurs when the PDM noise is added to the bit shift from 10 bits to 8 bits. In FIGS. 22A to 22C, the abscissa indicates coordinates in the horizontal direction in an image and the ordinate indicates pixel values in the respective coordinates. A level of the pixel value on the ordinate is set to 0 to 8 for convenience of illustration. FIG. 22A is a graph of a pixel value of a gray scale image quantized to 10 bits. In FIG. 22A, the level of the pixel value gradually increases by one level at a time from the left to the right in the horizontal direction. FIG. 22B is a graph of an example of a pixel value of an image quantized to 8 bits by omitting lower order 2 bits of the 10-bit gray scale image shown in FIG. 22A. In this case, a state of the pixel value substantially changing stepwise is seen. FIG. 22C is a graph of a change in a pixel value of an image obtained by adding the PDM noise to the image, the number of bits of which is converted into 8 bits, shown in FIG. 22B. In this case, it is seen that noise, a pixel value of which changes in a pulse-like manner, is added and intervals among the pieces of noise are narrowed in coordinates closer to steps. The steps are made less conspicuous by changing the pixel value in a pulse-like manner and changing the pulse intervals. The influence due to the addition of the PDM noise is explained with reference to the following diagrams in an example of an actual gray scale image.

FIGS. 23A to 23D are diagrams of images formed when the PDM noise is added to the bit shift from 10 bits to 8 bits. FIG. 23A is a diagram of an image of a 10-bit gray scale. Although a pixel value does not change in the vertical direction, a pixel value gradually changes in the horizontal direction. FIG. 23B is a diagram of an image formed by converting the 10-bit gray scale image into 8 bits by omitting lower order 2 bits. In this case, a state of the pixel value steeply changing is clearly seen. FIGS. 23C and 23D are diagrams of images formed by adding the PDM noise to the gray scale image quantized to 8 bits shown in FIG. 23B. In both FIGS. 23C and 23D, it is seen that steps are inconspicuous. The image shown in FIG. 23C is formed by the dither method and the image shown in FIG. 23D is formed by the error diffusion method. The dither method and the error diffusion methods are substantially different in that, whereas noise is added regardless of the human visual characteristic in the dither method, noise is added taking into account the human visual characteristic in the error diffusion method. As a representative two-dimensional filter used for the error diffusion method, a Jarvis, Judice & Ninke's filter (hereinafter referred to as Jarvis filter) and a Floyd & Steinberg's filter (hereinafter referred to as Floyd filter) are known (see, for example, Hitoshi Kiya, "Yokuwakaru Digital Image Processing", Sixth edition, CQ publishing Co., Ltd., January 2000, p. 196 to 213).

In order to represent the human visual characteristic, a contrast sensitivity curve representing a spatial frequency f [unit: cpd (cycle/degree)] on the abscissa and representing contrast sensitivity on the ordinate is used. The spatial frequency represents the number of stripes that can be displayed per unit angle (1 degree in angle of field) with respect to the angle of field. A maximum frequency in the spatial frequency depends on pixel density (the number of pixels per unit length) of a display apparatus and a viewing distance.

FIGS. 24A and 24B are diagrams concerning calculation of the maximum frequency in the spatial frequency in the display apparatus. In FIGS. 24A and 24B, an angle θ represents 1 degree in angle of field and a viewing distance D represents a distance between the display apparatus and a viewer as shown in FIG. 24B. Width "d" on a display screen with respect to 1 degree in angle of field is calculated from the angle θ and the viewing distance D by using the following relational expression:

$$\tan(\theta/2)=(d/2)/D$$

The maximum frequency in the spatial frequency as the number of stripes on the display screen per 1 degree in angle of field can be calculated by dividing the width "d" on the display screen by length per two pixels (the two pixels form one set of stripes) calculated from the pixel density of the display screen.

When, for example, a high-resolution printer having the maximum frequency of about 120 cpd is assumed as the display apparatus, as shown in FIG. 25A, it is possible to modulate quantization errors to a frequency band that is less easily sensed in a human vision characteristic 840 even by the Jarvis filter 851 and the Floyd filter 852. Amplitude characteristics of these representative filters are different. In general, the Jarvis filter is used when importance is attached to a low frequency band and the Floyd filter is used when a higher frequency is treated.

However, when a high-definition display having 1920 pixels×1080 pixels in the horizontal and vertical directions is assumed as the display apparatus, the maximum frequency per unit angle with respect to the angle of field is about 30 cpd. As shown in FIG. 25B, it is seen that it is difficult to modulate the quantization errors to a band with sufficiently low sensitivity with respect to the human visual characteristic 840 using the Jarvis Filter 851 and the Floyd filter 852. Such a situation is caused because, whereas a sampling frequency depends on pixel density of the display apparatus, the human visual characteristic has a peculiar value.

SUMMARY OF THE INVENTION

It is possible to modulate, using the error diffusion method, quantization errors due to gradation conversion involved in processing in an image processing apparatus or digital transmission to a frequency band less easily sensed by the human visual characteristic. However, a filter characteristic used for the error diffusion method is uniquely decided. Therefore, if viewing conditions such as performance of a display apparatus for viewing and a viewing distance between a viewer and the display apparatus change, a maximum frequency in a spatial frequency in the display apparatus also changes. As a result, error diffusion processing suitable for the display apparatus is not obtained by the uniquely-decided filter characteristic. For a display apparatus that displays an image signal, it is difficult to modulate the quantization errors to a frequency band with sufficiently low sensitivity with respect to the human visual characteristic using the Jarvis filter and the Floyd filter.

Therefore, it is desirable to modulate the quantization errors to a band with sufficiently low sensitivity with respect to the human visual characteristic by setting an optimum filter coefficient according to viewing conditions.

According to an embodiment of the present invention, there is provided an image processing apparatus including: filter-coefficient storing means for storing filter coefficients respectively associated with spatial frequencies, which are the numbers of strips displayed per unit angle with respect to an angle of field of a display apparatus; viewing-condition determining means for determining, as viewing conditions, a viewing distance between a viewer and the display apparatus and pixel density of the display apparatus; filter-coefficient setting means for setting a filter coefficient selected on the basis of a spatial frequency calculated from the viewing conditions among the stored filter coefficients; and gradation modulating means including quantizing means for quantizing a pixel value in a predetermined coordinate position in an image signal and outputting the pixel value as a quantized pixel value in the predetermined coordinate position, the gradation modulating means gradation-modulating the image signal by multiply-accumulating a set filter coefficient with respect to quantization errors caused by the quantizing means to feed back the quantization errors to an input side of the quantizing means. Therefore, there is an effect that the quantization errors are modulated to a band with sufficiently low sensitivity with respect to the human visual characteristic by setting an optimum filter coefficient according to viewing conditions.

Preferably, the viewing-condition determining means receives the number of pixels and a screen size of the display apparatus from the display apparatus and determines the viewing conditions on the basis of the number of pixels and the screen size. Therefore, there is an effect that the number of pixels and the screen size are received from the display apparatus and the viewing conditions are calculated on the basis of the number of pixels and the screen size.

Preferably, the viewing-condition determining means receives the pixel density and a screen size of the display apparatus from the display apparatus and determines the viewing conditions on the basis of the pixel density and the screen size. Therefore, there is an effect that the pixel density and the screen size are received from the display apparatus and the viewing conditions are calculated on the basis of the pixel density and the screen size.

Preferably, the filter coefficient is set to reduce the quantized error of frequency components lower than a predetermined spatial frequency. Therefore, there is an effect that quantization noise of the frequency components lower than the predetermined spatial frequency is reduced. In this case, the predetermined spatial frequency is set to about two third of a maximum frequency in the spatial frequency. Therefore, there is an effect that quantization noise of frequency components lower than about two third of the maximum frequency in the spatial frequency is reduced.

Preferably, the gradation modulating means further includes: inverse quantization means for inversely quantizing the quantized pixel value in the predetermined coordinate position and outputting the quantized pixel value as an inversely quantized pixel value in the predetermined coordinate position; differential generating means for generating, as quantization errors in the predetermined coordinate position, a difference value between the quantized pixel value in the predetermined coordinate position and the inversely quantized pixel value in the predetermined coordinate position; arithmetic means for calculating, as a feedback value in the predetermined coordinate position, a value obtained by multiplying the respective quantization errors in a predetermined area corresponding to the predetermined coordinate position with the set filter coefficient and adding up the quantization errors; and adding means for adding the feedback value in the predetermined coordinate position to the corrected pixel value in the predetermined coordinate position. Therefore, there is an effect that the quantization errors are modulated to a band with sufficiently low sensitivity with respect to the human visual characteristic by setting an optimum filter coefficient according to viewing conditions.

According to another embodiment of the present invention, there is provided a filter coefficient setting processing method for an image processing apparatus including a display apparatus, filter-coefficient storing means for storing filter coefficients respectively associated with spatial frequencies, which are the numbers of strips displayed per unit angle with respect to an angle of field of a display apparatus, and gradation modulating means including quantizing means for quantizing a pixel value in a predetermined coordinate position in a pixel signal and outputting the pixel value as a quantized pixel value in the predetermined coordinate position, the gradation modulating means gradation-modulating the image signal by multiply-accumulating a set filter coefficient with respect to quantization errors caused by the quantizing means to feed back the quantization errors to an input side of the quantizing means, the filter coefficient setting processing method including: a viewing-condition determining step of determining, as viewing conditions, a viewing distance between a viewer and the display apparatus and pixel density of the display apparatus; and a filter-coefficient setting step of setting, in the gradation modulating means, a filter coefficient selected on the basis of a spatial frequency calculated from the viewing conditions among the filter coefficients stored in the filter-coefficient storing means. There is also provided a computer program for causing a computer to execute these steps. Therefore, there is an effect that the gradation modulating means is caused to set an optimum filter coefficient according to viewing conditions.

According to the embodiments of the present invention, it is possible to realize an excellent effect that quantization errors can be modulated to a band with sufficiently low sensitivity with respect to the human visual characteristic by setting an optimum filter coefficient according to viewing conditions.

BRIEF DESCRIPTION OF THE DRAWINGS

FIGS. 11A and 11B are tables of storage format examples of a filter-coefficient storing unit 270 according to the embodiment;

FIG. 12 is a table of a modification of a storage format of the filter-coefficient storing unit 270 according to the embodiment;

FIG. 19 is a diagram of a storage format example of an apparatus-information storing unit 720 according to the second modification;

DESCRIPTION OF THE PREFERRED EMBODIMENTS

An embodiment of the present invention is explained in detail below with reference to the accompanying drawings.

Figure 1:
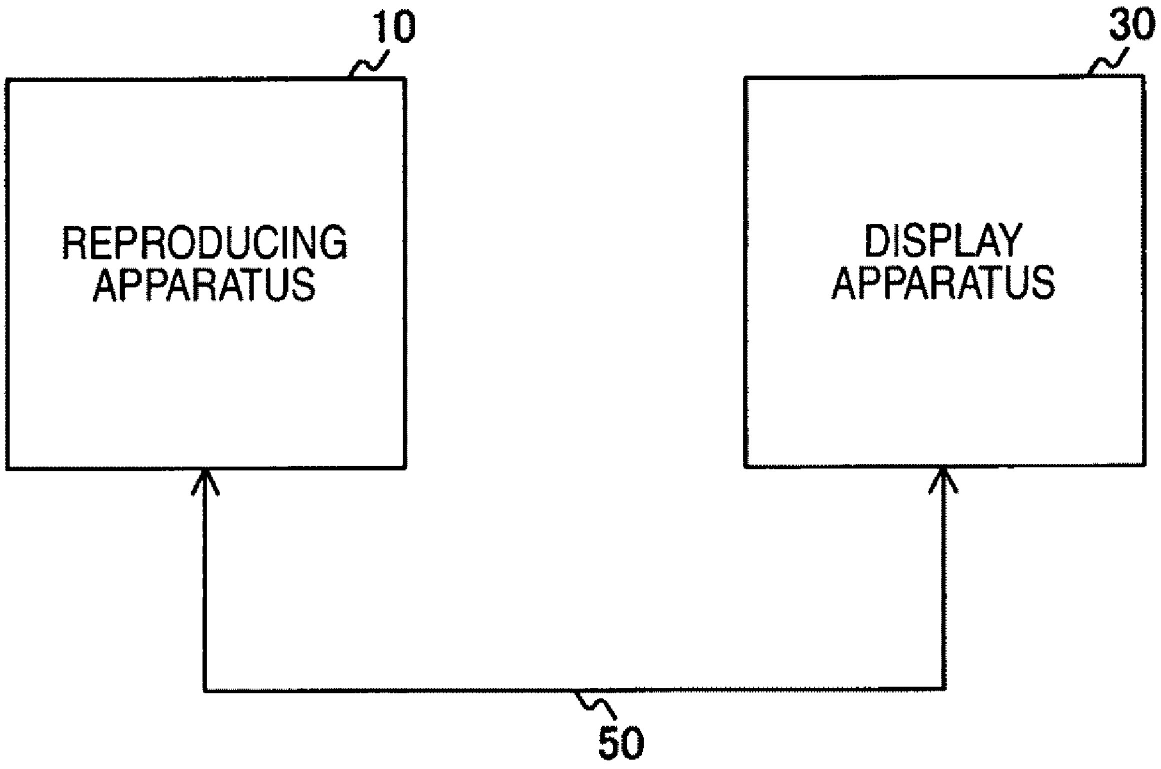
FIG. 1 is a diagram of a configuration example of a reproduction and display system according to an embodiment of the present invention.

FIG. 1 is a diagram of a configuration example of a reproduction and display system according to the embodiment of the present invention. The reproduction and display system includes a reproducing apparatus 10 that reproduces a data signal recorded in a recording medium and a broadcast signal digitally broadcasted and a display apparatus 30 that displays the reproduced signals. The reproducing apparatus 10 and the display apparatus 30 are connected by a digital transmission signal line 50. An image signal and a sound signal processed by the reproducing apparatus 10 are transmitted to the display apparatus 30 via the digital transmission signal line 50 and displayed on a display screen of the display apparatus 30.

Figure 2:
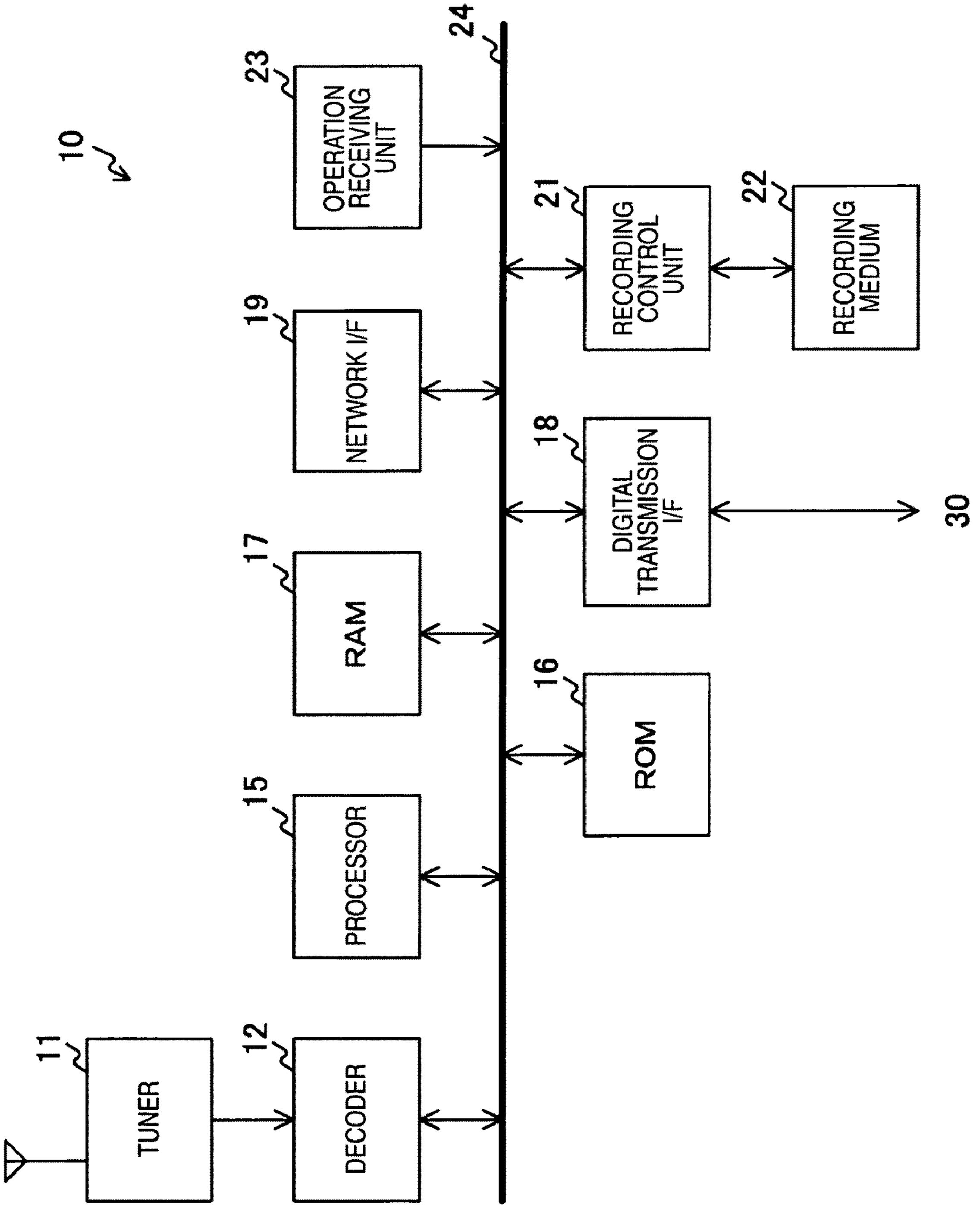
FIG. 2 is a diagram of a configuration example of a reproducing apparatus 10 according to the embodiment.

FIG. 2 is a diagram of a configuration example of the reproducing apparatus 10 according to this embodiment.

The reproducing apparatus 10 includes a tuner 11, a decoder 12, a processor 15, a ROM (Read-Only Memory) 16, a RAM (Random Access Memory) 17, a digital transmission interface (I/F) 18, a network interface (I/F) 19, a recording control unit 21, a recording medium 22, an operation receiving unit 23, and a bus 24. The reproducing apparatus 10 transmits the processed image signal and sound signal to the display apparatus 30 via the digital transmission interface 18.

The tuner 11 receives a radio wave of a digital broadcast and demodulates a modulated wave of a channel designated by the operation receiving unit 23. The tuner 11 supplies demodulated image data and sound data to the decoder 12.

The decoder 12 decodes the image data and the sound data demodulated by the tuner 11. The decoder 12 supplies the decoded image signal and sound signal to the processor 15.

The ROM 16 is a memory that stores various control programs and the like. The RAM 17 is a memory that has a work area for the processor 15.

Figure 24A:
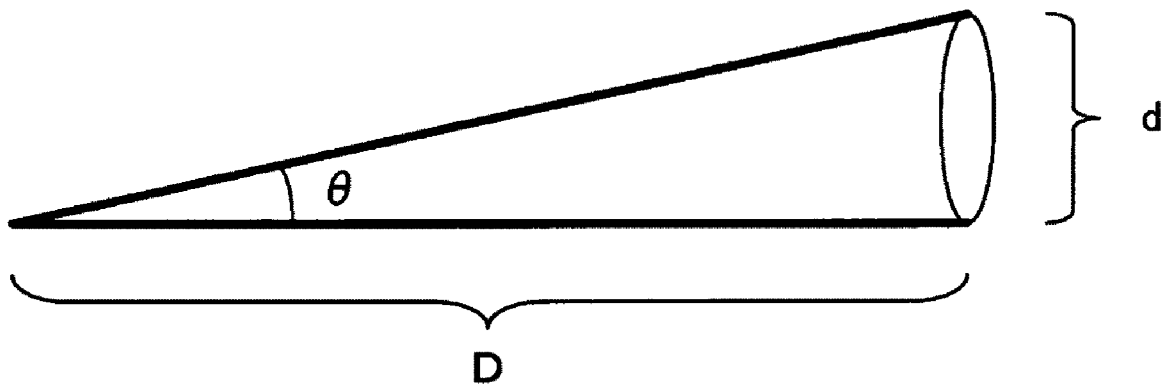
FIGS. 24A and 24B are diagrams concerning calculation of a maximum frequency in a spatial frequency in the display apparatus.
Figure 24B:
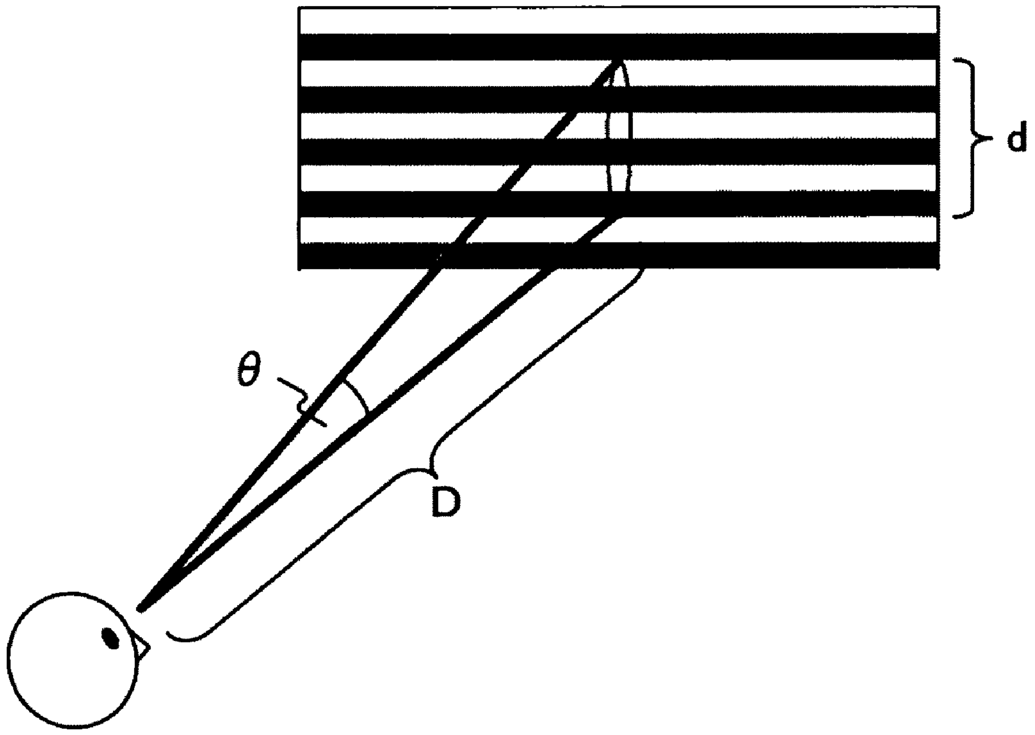
Figure 25A:
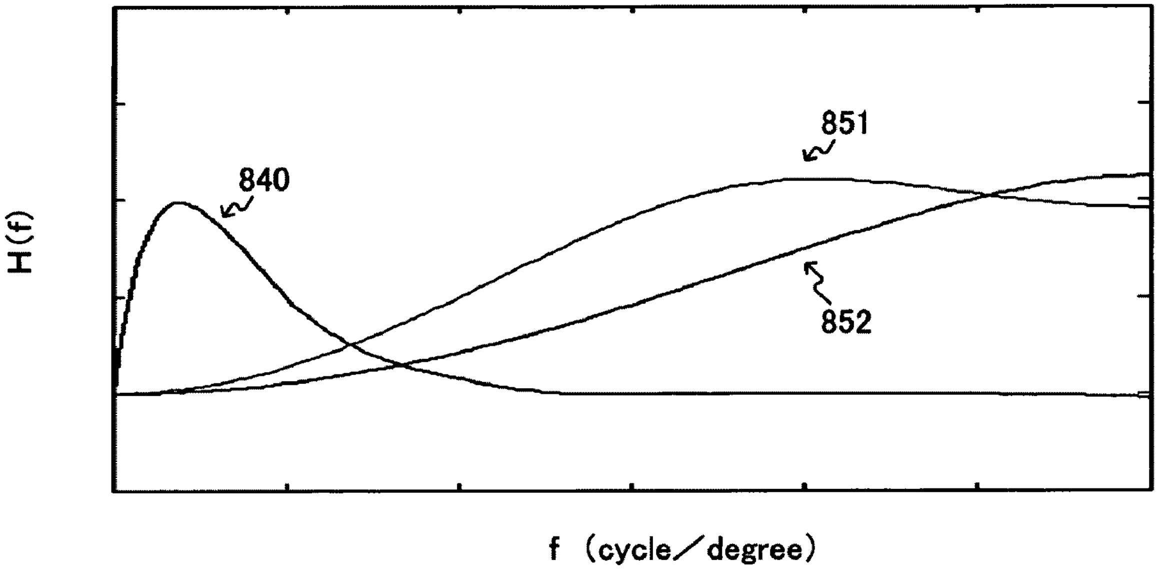
FIGS. 25A and 25B are graphs of the human visual characteristic and amplitude characteristics of filters in the past.
Figure 25B:
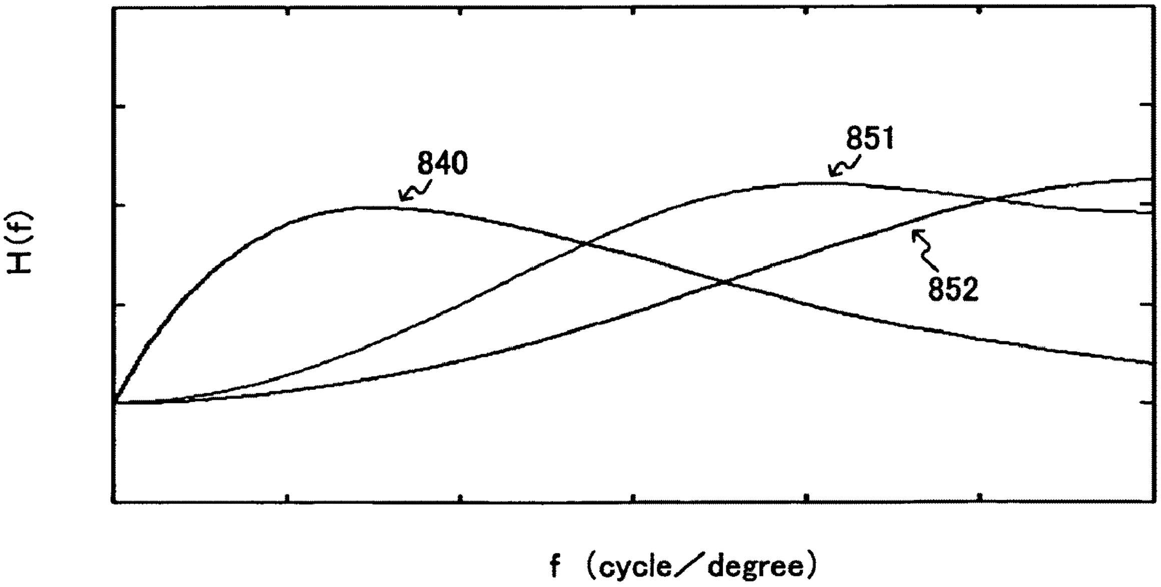

The digital transmission interface 18 performs data communication between the reproducing apparatus 10 and the display apparatus 30 connected to the digital transmission signal line 50. The digital transmission interface 18 can be realized by a digital transmission interface such as an HDMI (High-Definition Multimedia Interface) or a DVI (Digital Visual Interface). The digital transmission interface 18 transmits the image signal and the sound signal processed by the processor 15 to the display apparatus 30. Specifically, the digital transmission interface 18 acquires screen information concerning viewing conditions from the display apparatus 30 and supplies the screen information to the processor 15. The viewing conditions are a viewing distance between a viewer and the display apparatus 30 and pixel density of the display apparatus 30. As shown in FIGS. 24A and 24B, the viewing conditions are parameters for calculating a maximum frequency in a spatial frequency in the display apparatus 30. The screen information concerning the viewing conditions is a parameter necessary for calculating the viewing conditions. In this embodiment, for calculation of the pixel density, the digital transmission interface 18 acquires the vertical length of the screen and the number of pixels in the vertical direction of the screen from the display apparatus 30 as the screen information. Concerning the viewing distance, in general, in a display screen with an aspect ratio of 16:9, a viewing distance 2.5 to 3.0 times as large as the vertical length of the screen is an optimum viewing distance. Therefore, a viewing distance obtained by multiplying the vertical length of the screen with 2.5 or 3.0 is set as the viewing distance. This makes it possible to calculate the vertical length of the screen included in the screen information.

As an example, the pixel density, which is one of the viewing conditions, is calculated from the vertical length of the screen and the number of pixels in the vertical direction of the screen. However, the pixel density may be calculated from the horizontal width of the screen and the number of pixels in the horizontal direction of the screen. The viewing distance, which is the other of the viewing conditions, is calculated on the basis of the vertical length of the screen. However, the viewing distance may be calculated by using the horizontal width of the screen instead of the vertical length of the screen. In this case, for example, the viewing distance can be calculated by using the following relational expression of the horizontal width of the screen in the display screen with the aspect ratio of 16:9 and the viewing distance:

$$\text{Horizontal width of the screen} = \text{viewing distance} \times 0.650$$

The network interface 19 performs data communication with an external apparatus connected to the Internet, a LAN (Local Area Network), or the like.

The recording control unit 21 records image data in the recording medium 22 in a predetermined format on the basis of the control by the processor 15 or reads out image data recorded in the recording medium 22.

The recording medium 22 stores video data. The recording medium 22 is, for example, a hard disk driver or a Blu-ray disk.

The operation receiving unit 23 receives channel selection or operation inputs such as reproduction and stop of the reproduction of the image data stored in the recording medium 22 from a user of the reproducing apparatus 10.

The processor 15 controls the respective components of the reproducing apparatus 10 on the basis of the control programs stored in the ROM 16. For example, the processor 15 calculates the viewing conditions (the pixel density and the viewing distance) from the screen information (the vertical length of the screen and the number of pixels in the vertical direction of the screen) supplied from the digital transmission interface 18 and calculates a maximum frequency in a spatial frequency in the display apparatus 30 from the viewing conditions as shown in FIGS. 24A and 24B. The processor 15 applies, on the basis of the spatial frequency, gradation modulation for modulating quantization errors (quantization noise) to a high-frequency region to the image signal supplied from the recording control unit 21 or the decoder 12 and controls the reproducing apparatus 10 to transmit the image signal to the display apparatus 30 via the digital transmission interface 18.

The bus 24 is a system bus of the reproducing apparatus 10 that connects the processor 15 and the respective components to each other.

The processor 15 calculates the pixel density, which is one of the viewing conditions, from the vertical length of the screen and the number of pixels in the vertical direction of the screen acquired from the display apparatus 30 and calculates the viewing distance, which is the other of the viewing conditions, on the basis of the vertical length of the screen. However, the processor 15 may acquire the pixel density and the vertical length of the screen and calculate only the viewing distance from the vertical length of the screen. Further, the processor 15 calculates the viewing distance on the basis of the vertical length of the screen. However, the processor 15 may measure a distance between a remote controller of the display apparatus 30 and the display screen of the display apparatus 30 using a technique such as UWB (Ultra Wide Band) and causes the display apparatus 30 to transmit the distance to the reproducing apparatus 10 as a viewing distance. The processor 15 acquires, for calculation of the viewing conditions, the screen information of the display apparatus 30 via the digital transmission interface 18. However, the processor 15 may directly set the viewing conditions (the pixel density and the viewing distance) in the operation receiving unit 23.

Figure 3:
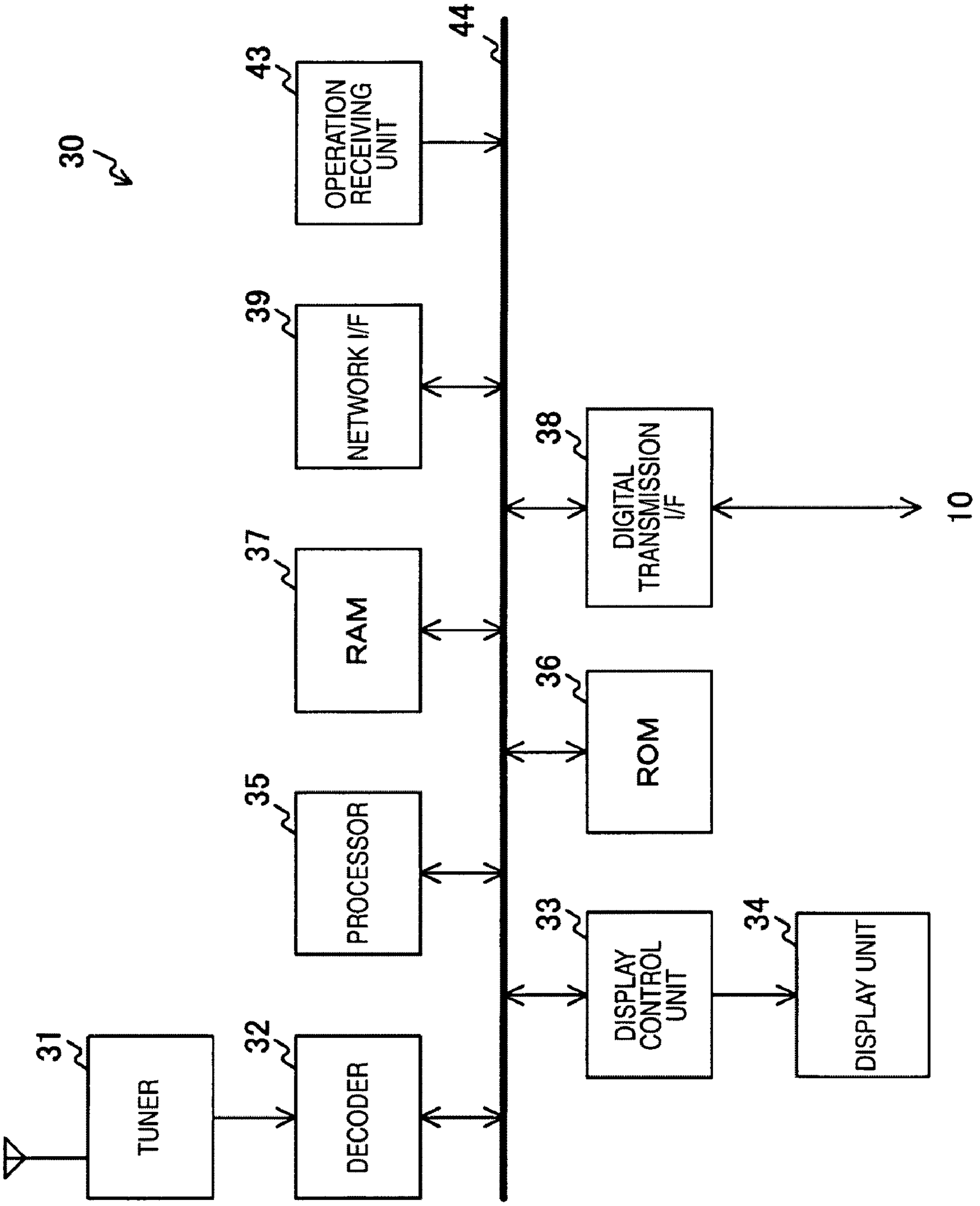
FIG. 3 is a diagram of a configuration example of a display apparatus 30 according to the embodiment.

FIG. 3 is a diagram of a configuration example of the display apparatus 30 according to the embodiment.

The display apparatus 30 includes a tuner 31, a decoder 32, a display control unit 33, a display unit 34, a processor 35, a ROM 36, a RAM 37, a digital transmission interface (I/F) 38, a network interface (I/F) 39, an operation receiving unit 43, and a bus 44. The display apparatus 30 receives, via the digital transmission interface 38, an image signal subjected to image processing by the reproducing apparatus 10 and displays the image signal on the display screen. Functions of the components other than the display control unit 33, the display unit 34, the processor 35, and the digital transmission interface 38 are the same as those of the reproducing apparatus 10. Therefore, explanation of the functions is omitted.

The display control unit 33 causes the display unit 34 to display the image signal on the basis of the control by the processor 35.

The display unit 34 displays the image signal on the basis of the control by the display control unit 33. The digital transmission interface 38 performs data communication between the display apparatus 30 and the reproducing apparatus 10 connected to the digital transmission signal line 50. Specifically, the digital transmission interface 38 transmits the screen information (the vertical length of the screen and the number of pixels in the vertical direction of the screen) on the basis of the control by the processor 35. The digital transmission interface 38 receives an image signal and a sound signal processed by the reproducing apparatus 10.

The processor 35 controls the respective components of the display apparatus 30 on the basis of the control programs stored in the ROM 36. Specifically, for example, the processor 35 controls the display apparatus 30 to transmit screen information of the display apparatus 30 to the reproducing apparatus 10 via the digital transmission interface 38. The processor 35 controls the display apparatus 30 to display an image signal supplied from the digital transmission interface 38 or the decoder 32 on the display unit 34.

Figure 4:
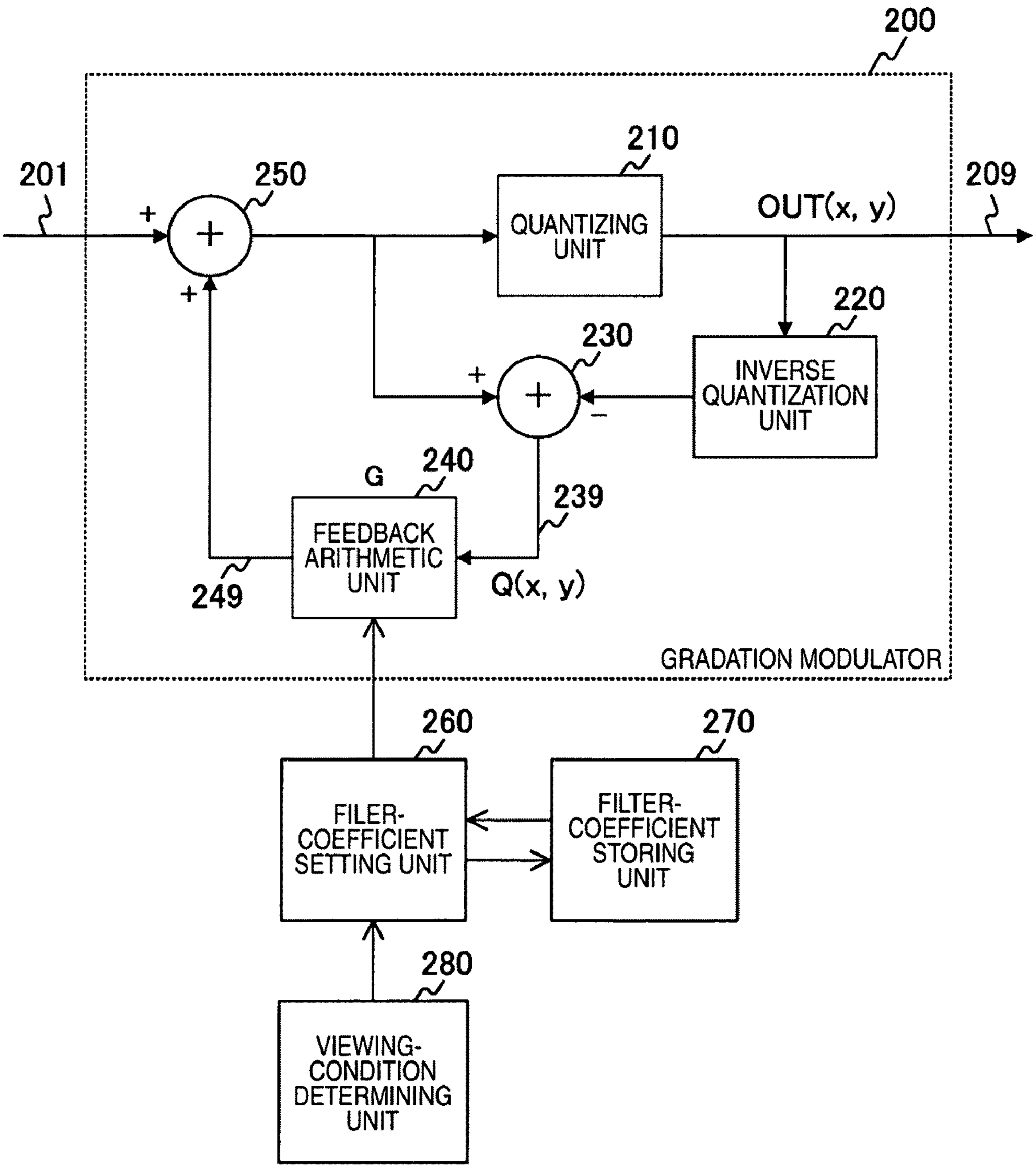
FIG. 4 is a diagram of a functional configuration example of the reproducing apparatus 10 according to the embodiment.

FIG. 4 is a diagram of a functional configuration example of the reproducing apparatus 10 according to this embodiment. The reproducing apparatus 10 includes a gradation modulator 200, a filter-coefficient setting unit 260, a filter-coefficient storing unit 270, and a viewing-condition determining unit 280.

The gradation modulator 200 receives a two-dimensional image signal from a signal line 201 as an input signal IN(x,y) and outputs an output signal OUT (x,y) from a signal line 209. The gradation modulator 200 configures a ΔΣ modulator and has a noise shaping effect for modulating quantization errors to a high-frequency region.

The quantizing unit 210 is a quantizer that quantizes an output of an adder 250. For example, when data having 12-bit width is inputted from the adder 250, the quantizing unit 210 omits lower order 4 bits and outputs higher order 8 bits as an output signal OUT(x,y).

The inverse quantization unit 220 is an inverse quantizer that inversely quantizes the output signal OUT(x,y) quantized by the quantizing unit 210. For example, when the quantized output signal OUT(x,y) has 8-bit width, the inverse quantization unit 220 embeds "0000" in the lower order 4 bits (padding) and outputs 12-bit width data.

A subtracter 230 is a subtracter that calculates a difference between the output of the adder 250 and the output of the inverse quantization unit 220. The subtracter 230 subtracts the output of the inverse quantization unit 220 from the output of the adder 250 to thereby output quantized errors Q(x,y) omitted by the quantizing unit 210 to a signal line 239.

A feedback arithmetic unit 240 multiplies the quantization errors Q(x,y) in the past outputted from the subtracter 230 with a filter coefficient set by the filter-coefficient setting unit 260 and adds up the quantization errors Q(x,y). A value calculated by multiply-accumulate by the feedback arithmetic unit 240 is supplied to the adder 250 as a feedback value.

The adder 250 is an adder for feeding back the feedback value calculated by the feedback arithmetic unit 240 to a correction signal F(x,y) inputted to the gradation modulator 200. The adder 250 adds up the correction signal F(x,y) inputted to the gradation modulator 200 and the feedback value calculated by the feedback arithmetic unit 240 and outputs a result of the addition to the quantizing unit 210 and the subtracter 230.

In the image processing apparatus, the gradation modulator 200 has an input and output relation explained below.

$$\mathrm{OUT}(x,y)=F(x,y)+(1-G)\times Q(x,y)$$

It is seen that the quantization errors Q(x,y) is modulated to a high frequency by the noise shaping of "1−G".

The filter-coefficient setting unit 260 selects, on the basis of the viewing conditions supplied from the viewing-condition determining unit 280, a filter coefficient associated with a spatial frequency determined on the basis of the viewing conditions from the filter-coefficient storing unit 270. The filter-coefficient setting unit 260 sets the selected filter coefficient in the feedback arithmetic unit 240. The filter-coefficient setting unit 260 can be realized by the processor 15.

The filter-coefficient storing unit 270 stores filter coefficients associated with spatial frequencies, respectively. The filter-coefficient storing unit 270 can be realized by the ROM 16.

The viewing-condition determining unit 280 receives screen information from the display apparatus 30 and calculates viewing conditions. When it is difficult for the viewing-condition determining unit 280 to receive the screen information, the viewing-condition determining unit 280 may calculate the viewing conditions using a value decided in advance. The viewing-condition determining unit 280 supplies the calculated viewing conditions to the filter-coefficient setting unit 260. The viewing-condition determining unit 280 can be realized by the digital transmission interface 18 and the processor 15.

Figure 5:
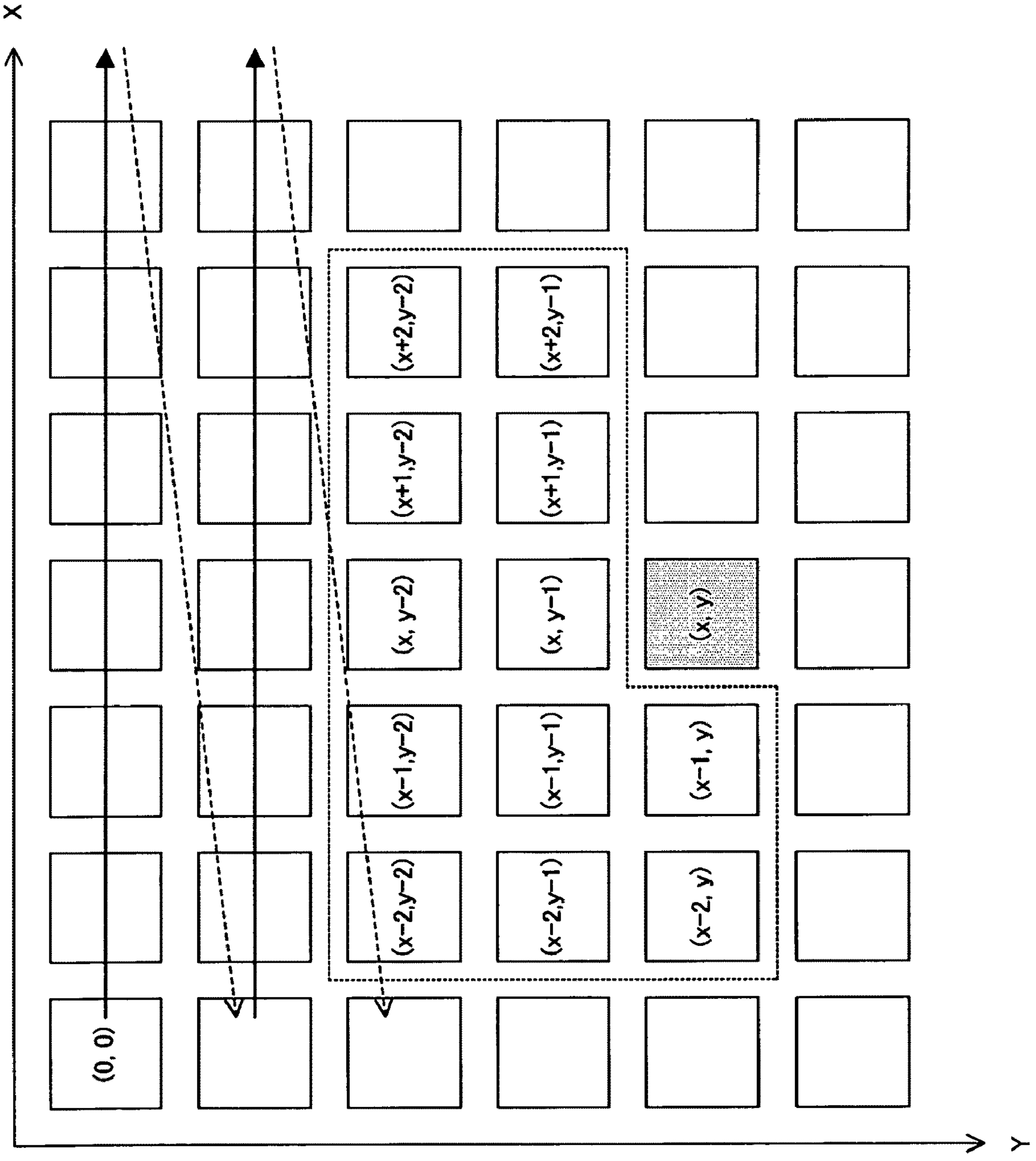
FIG. 5 is a diagram of processing order for respective pixels of an image signal according to the embodiment.

FIG. 5 is a diagram of processing order for respective pixels of an image signal according to this embodiment. As an arrangement of the pixels of the image signal, a reference coordinate (0,0) is set at the upper left and the horizontal direction X and the vertical direction Y are indicated by the abscissa and the ordinate, respectively.

Image processing according to this embodiment is performed to sequentially raster-scan the pixels from the left to the right and from the top to the bottom as indicated by arrows in the figure. Input signals are inputted in order of IN(0,0), IN(1,0), IN(2,0), . . . , IN(0,1), IN(1,1), IN(2,1), . . . .

The feedback arithmetic unit 240 takes into account the order of the raster scan as a predetermined area in referring to the other pixels. For example, when the feedback arithmetic unit 240 calculates a feedback value corresponding to the correction signal F(x,y), the feedback arithmetic unit 240 refers to twelve quantization errors Q(x−2,y−2), Q(x−1,y−2), Q(x,y−2), Q(x+1,y−2), Q(x+2,y−2), Q(x−2,y−1), Q(x−1,y−1), Q(x,y−1), Q(x+1,y−1), Q(x+2,y−1), Q(x−2, y), and Q(x−1,y) in an area surrounded by a dotted line, i.e., quantization errors in the past.

In the case of a color image signal including a luminance signal Y, color difference signals Cb and Cr, and the like, gradation conversion processing is applied to the respective signals. The luminance signal Y is independently subjected to the gradation conversion processing. The color difference signals Cb and Cr are also independently subjected to the gradation conversion processing.

Figure 6:
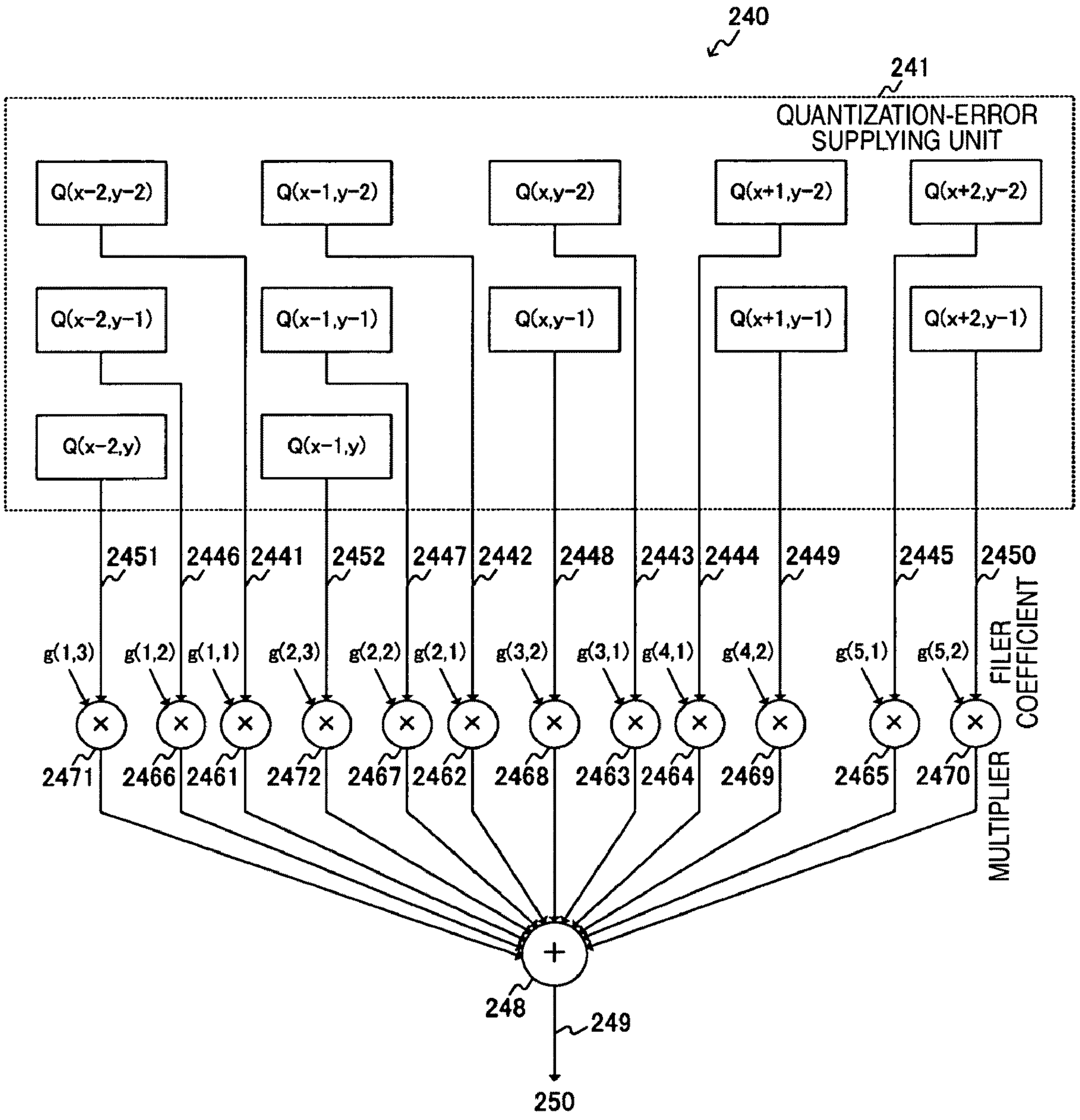
FIG. 6 is a diagram of a configuration example of a feedback arithmetic unit 240 according to the embodiment.

FIG. 6 is a diagram of a configuration example of the feedback arithmetic unit 240 according to this embodiment. The feedback arithmetic unit 240 includes a quantization-error supplying unit 241, multipliers 2461 to 2472, and an adder 248.

The quantization-error supplying unit 241 supplies values in the past of the quantization errors Q(x,y). In this example, it is assumed that the twelve quantization errors Q(x−2,y−2), Q(x−1,y−2), Q(x,y−2), Q(x+1,y−2), Q(x+2,y−2), Q(x−2,y−

1), Q(x−1,y−1), Q(x,y−1), Q(x+1,y−1), Q(x+2,y−1), Q(x−2,y), and Q(x−1,y) are supplied.

The multipliers 2461 to 2472 are multipliers that multiply the quantization errors Q supplied from the quantization-error supplying unit 241 and filter coefficients "g" together. In this example, assuming twelve filter coefficients, the multiplier 2461 multiplies the quantization error Q(x−2,y−2) and a filter coefficient g(1,1) together, the multiplier 2462 multiplies the quantization error Q(x−1,y−2) and a filter coefficient g(2,1) together, the multiplier 2463 multiplies the quantization error Q(x,y−2) and a filter coefficient g(3,1) together, the multiplier 2464 multiplies the quantization error Q(x+1,y−2) and a filter coefficient g(4,1) together, the multiplier 2465 multiplies the quantization error Q(x+2,y−2) and a filter coefficient g(5,1) together, the multiplier 2466 multiplies the quantization error Q(x−2,y−1) and a filter coefficient g(1,2) together, the multiplier 2467 multiplies the quantization error Q(x−1,y−1) and a filter coefficient g(2,2) together, the multiplier 2468 multiplies the quantization error Q(x,y−1) and a filter coefficient g(3,2) together, the multiplier 2469 multiplies the quantization error Q(x+1,y−1) and a filter coefficient g(4,2) together, the multiplier 2470 multiplies the quantization error Q(x+2,y−1) and a filter coefficient g(5,2) together, the multiplier 2471 multiplies the quantization error Q(x−2,y) and a filter coefficient g(1,3) together, and the multiplier 2472 multiplies the quantization error Q(x−1,y) and a filter coefficient g(2,3) together.

The adder 248 is an adder that adds up outputs of the multipliers 2461 to 2472. A result of the addition by the adder 248 is supplied to one input of the adder 250 as a feedback value via a signal line 249.

Figure 7:
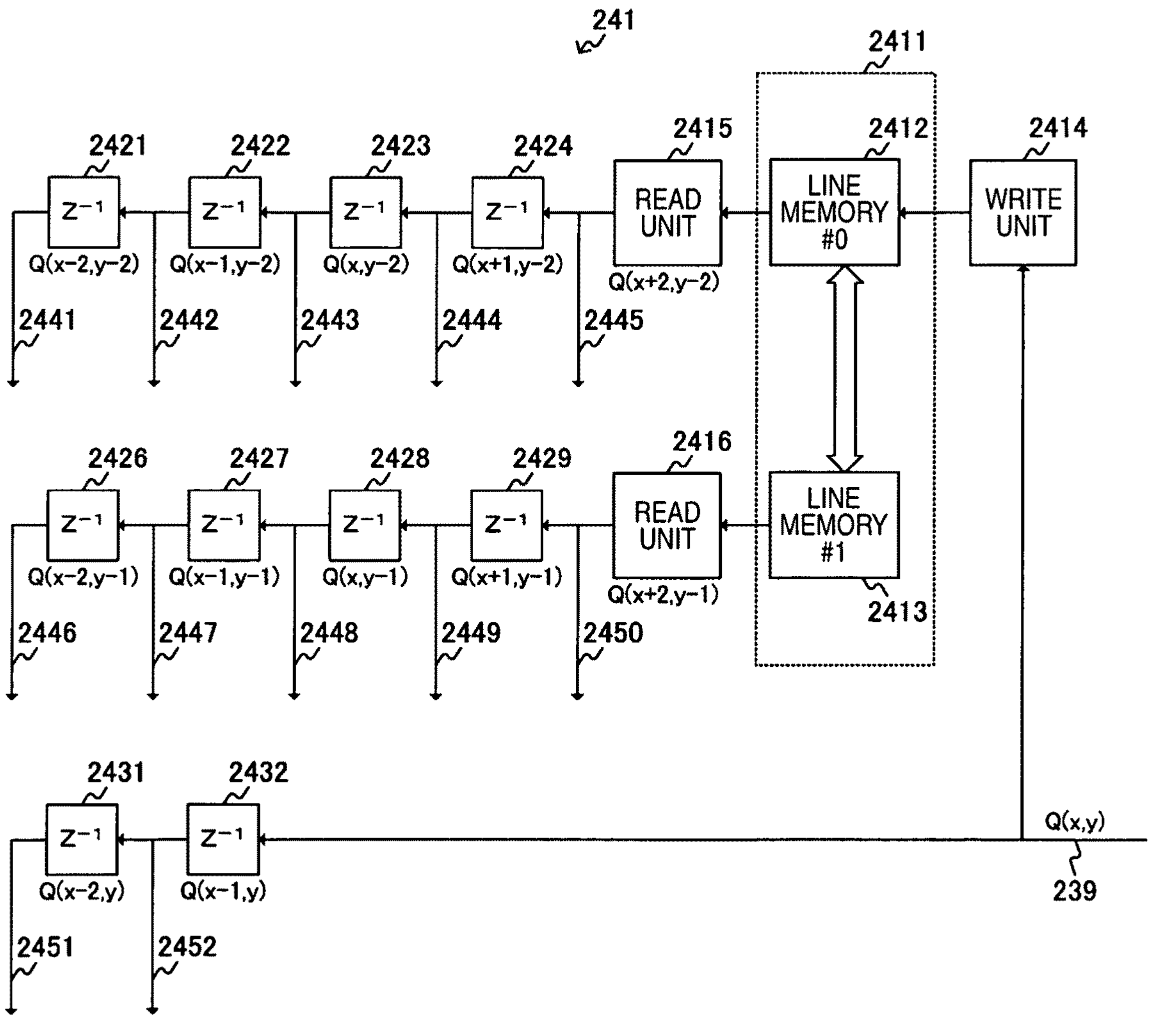
FIG. 7 is a diagram of a configuration example of a quantization-error supplying unit 241 according to the embodiment.

FIG. 7 is a diagram of a configuration example of the quantization-error supplying unit 241 according to this embodiment. The quantization-error supplying unit 241 includes a memory 2411, a write unit 2414, read units 2415 and 2416, and delay elements 2421 to 2432.

The memory 2411 includes line memories #0 (2412) and #1 (2413). The line memory #0 (2412) is a memory that stores the quantization errors Q of a line in the vertical direction Y=(y−2). The line memory #1 (2413) is a memory that stores the quantization errors Q of a line in the vertical direction Y=(y−1).

The write unit 2414 writes the quantization errors Q(x,y) in the memory 2411. The read unit 2415 reads out the quantization errors Q of the line in the vertical direction Y=(y−2) one by one from the line memory #0 (2412). The quantization error Q(x+2,x−2) as an output of the read unit 2415 is inputted to the delay element 2424 and supplied as one input to the multiplier 2465 via a signal line 2455. The read unit 2416 reads out the quantization errors Q of the line in the vertical direction Y=(y−1) one by one from the line memory #1 (2413). The quantization error Q(x+2,y−1) as an output of the read unit 2416 is inputted to the delay element 2429 and supplied as one input to multiplier 2470 via a signal line 2450.

The delay elements 2421 to 2424 configure a shift resistor that delays an output of the read unit 2415. The quantization error Q(x+1,y−2) as an output of the delay element 2424 is inputted to the delay element 2423 and supplied as one input to the multiplier 2464 via a signal line 2444. The quantization error Q(x,y−2) as an output of the delay element 2423 is inputted to the delay element 2422 and supplied as one input to the multiplier 2463 via a signal line 2443. The quantization error Q(x−1,y−2) as an output of the delay element 2422 is inputted to the delay element 2421 and supplied as one input to the multiplier 2462 via a signal line 2442. The quantization error Q(x−2,y−2) as an output of the delay element 2421 is supplied as one input to the multiplier 2461 via a signal line 2441.

The delay elements 2426 to 2429 configure a shift register that delays an output of the read unit 2416. The quantization error Q(x+1,y−1) as an output of the delay element 2429 is inputted to the delay element 2428 and supplied as one input to the multiplier 2469 via a signal line 2449. The quantization error Q(x,y−1) as an output of the delay element 2428 is inputted to the delay element 2427 and supplied as one input to the multiplier 2468 via a signal line 2448. The quantization error Q(x−1,y−1) as an output of the delay element 2427 is inputted to the delay element 2426 and supplied as one input to the multiplier 2467 via a signal line 2447. The quantization error Q(x−2,y−1) as an output of the delay element 2426 is supplied as one input to the multiplier 2466 via a signal line 2446.

The delay elements 2431 and 2432 configure a shift resister that delays the quantization errors Q(x,y). The quantization error Q(x−1,y) as an output of the delay element 2432 is inputted to the delay element 2431 and supplied as one input to the multiplier 2472 via a signal line 2452. The quantization error Q(x−2,y) as an output of the delay element 2431 is supplied as one input to the multiplier 2471 via a signal line 2451.

The quantization errors Q(x,y) of the signal line 239 are stored in an address "x" of the line memory #0 (2412). When processing for one line is finished in the order of the raster scan, the line memory #0 (2412) and the line memory #1 (2413) are interchanged. Therefore, quantization errors stored in the line memory #0 (2412) correspond to the lines in the vertical direction Y=(y−2) and quantization errors stored in the line memory #1 (2413) correspond to the lines in the vertical direction Y=(y−1).

Figure 8:
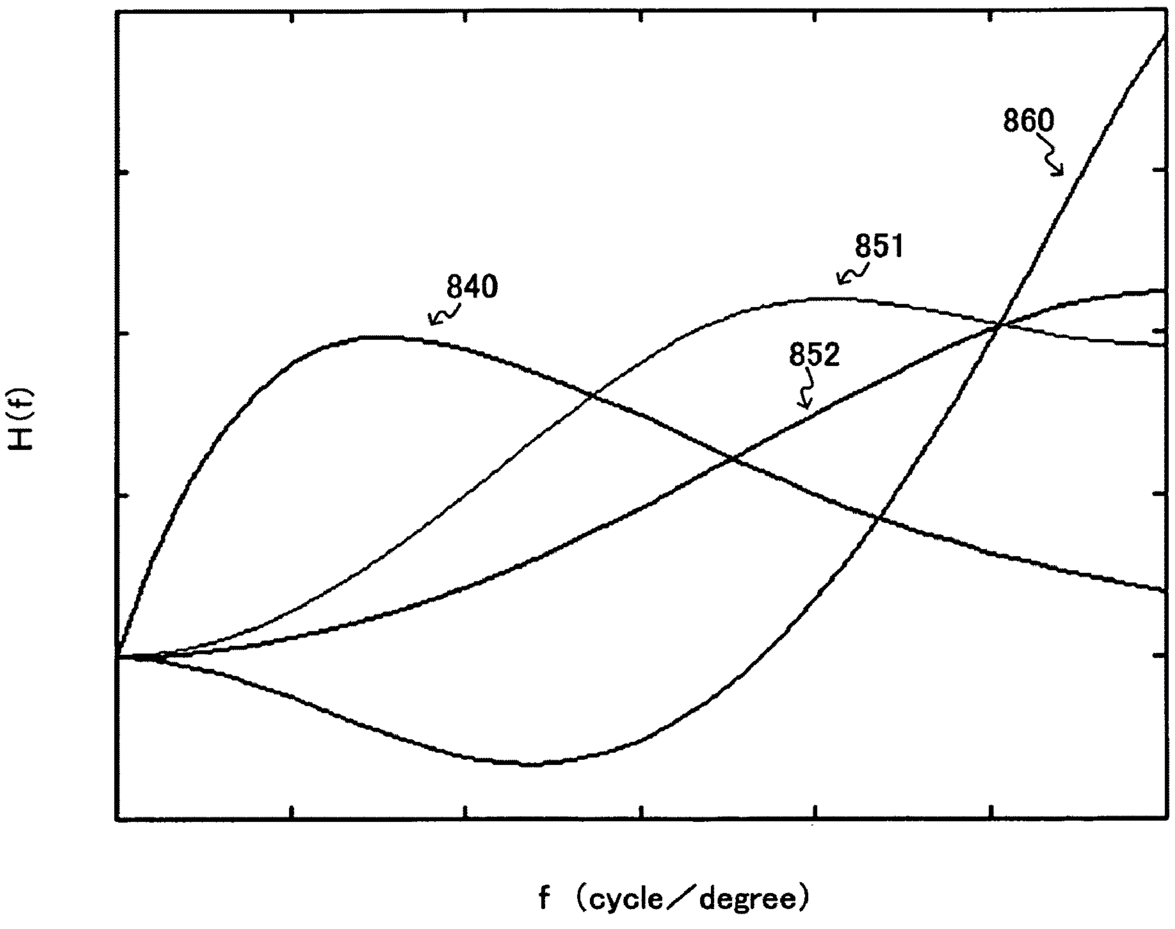
FIG. 8 is a graph of the human visual characteristic and amplitude characteristics of filters at the time when a maximum frequency in a spatial frequency is set to 30 cpd.

FIG. 8 is a graph of the human visual characteristic and amplitude characteristics of filters at the time when a maximum frequency in a spatial frequency is set to 30 cpd. The abscissa represents a spatial frequency "f" [cpd]. Concerning the human visual characteristic 840, the ordinate represents contrast sensitivity. Concerning the amplitude characteristics (851, 852, and 860) of the filters, the ordinate represents gains of the filters.

The human visual characteristic 840 reaches a peak value near the spatial frequency "f" of 7 cpd and is attenuated to near 60 cpd. On the other hand, the amplitude characteristic 860 by the reproducing apparatus according to this embodiment is a curve that is attenuated in a minus direction to near the spatial frequency "f" of 12 cpd and, thereafter, steeply rises. In the amplitude characteristic 860, a quantization error of low frequency components is attenuated to about two third of the maximum frequency in the spatial frequency. The quantization error is modulated to a band with sufficiently low sensitivity with respect to the human visual characteristic 840.

In the Jarvis filter 851 and the Floyd filter 852 in the past, it is difficult to modulate quantization errors to a band with a sufficiently low sensitivity with respect to the human visual characteristic 840.

Figure 9:
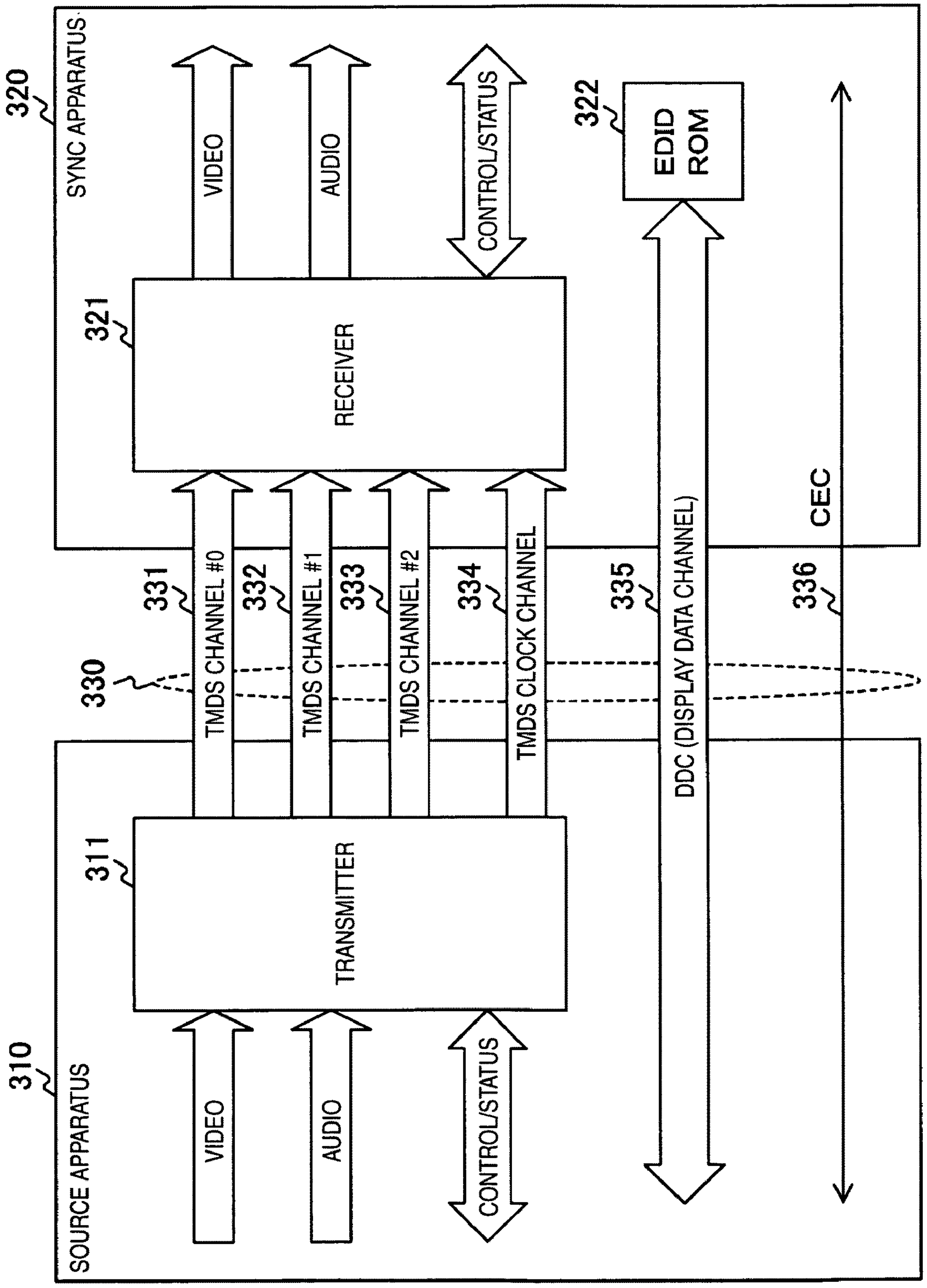
FIG. 9 is a diagram of a conceptual configuration example concerning screen information acquisition by a digital transmission interface 18 according to the embodiment.

FIG. 9 is a diagram of a conceptual configuration example concerning screen information acquisition by the digital transmission interface 18 according to this embodiment. As an example, an interface conforming to the HDMI standard is explained. In the HDMI standard, a transmission direction by a high-speed transmission line as a basis is set in one direction. An apparatus on a transmission side is referred to as source apparatus and an apparatus on a reception side is referred to as sync apparatus. In the example shown in FIG. 1, the reproducing apparatus 10 corresponds to the source apparatus and the display apparatus 30 corresponds to the sync apparatus. In this example, the source apparatus 310 and the sync apparatus 320 are connected by an HDMI cable 330. The source apparatus 310 includes a transmitter 311 that performs a transmission operation. The sync apparatus 320 includes a receiver 321 that performs a reception operation. The transmitter 311 corresponds to the digital transmission interface 18 and the receiver 321 corresponds to the digital transmission interface 38.

A TMDS serial transmission system is used for the transmission between the transmitter 311 and the receiver 321. In the HDMI standard, an image signal and a sound signal are transmitted by using three TMDS channels 331 to 333. In a valid image section, which is a section obtained by excluding a horizontal blanking section and a vertical blanking section in a section from a certain vertical synchronization signal to the next vertical synchronization signal, a differential signal corresponding to pixel data of an image for uncompressed one screen is transmitted in one direction to the sync apparatus 320 by the TMDS channels 331 to 333. In the horizontal blanking section and the vertical blanking section, a differential signal corresponding to sound data, control data, other auxiliary data, or the like is transmitted in one direction to the sync apparatus 320 by the TMDS channels 331 to 333.

In the HDMI standard, a clock signal is transmitted by a TMDS clock channel 334. In each of the TMDS channels 331 to 333, pixel data for 10 bits can be transmitted during one clock transmitted by the TMDS clock channel 334.

In the HDMI standard, a display data channel (DDC) 335 is provided. The display data channel 335 is used by the source apparatus 310 to read out EDID (Extended Display Identification Data) in the sync apparatus 320. The EDID information indicates, when the sync apparatus 320 is a display apparatus, information concerning a model, setting of a screen size, timing, and the like, and performance of the sync apparatus 320. The EDID information is stored in an EDID ROM 322 of the sync apparatus 320. Further, in the HDMI standard, a CEC (Consumer Electronics Control) line 336 is provided. The CEC line 336 is a line for performing bidirectional communication of an apparatus control signal. Whereas the display data channel 335 connects apparatuses in a one to one relation, the CEC line 336 directly connects all apparatuses connected to the HDMI.

Figure 10:
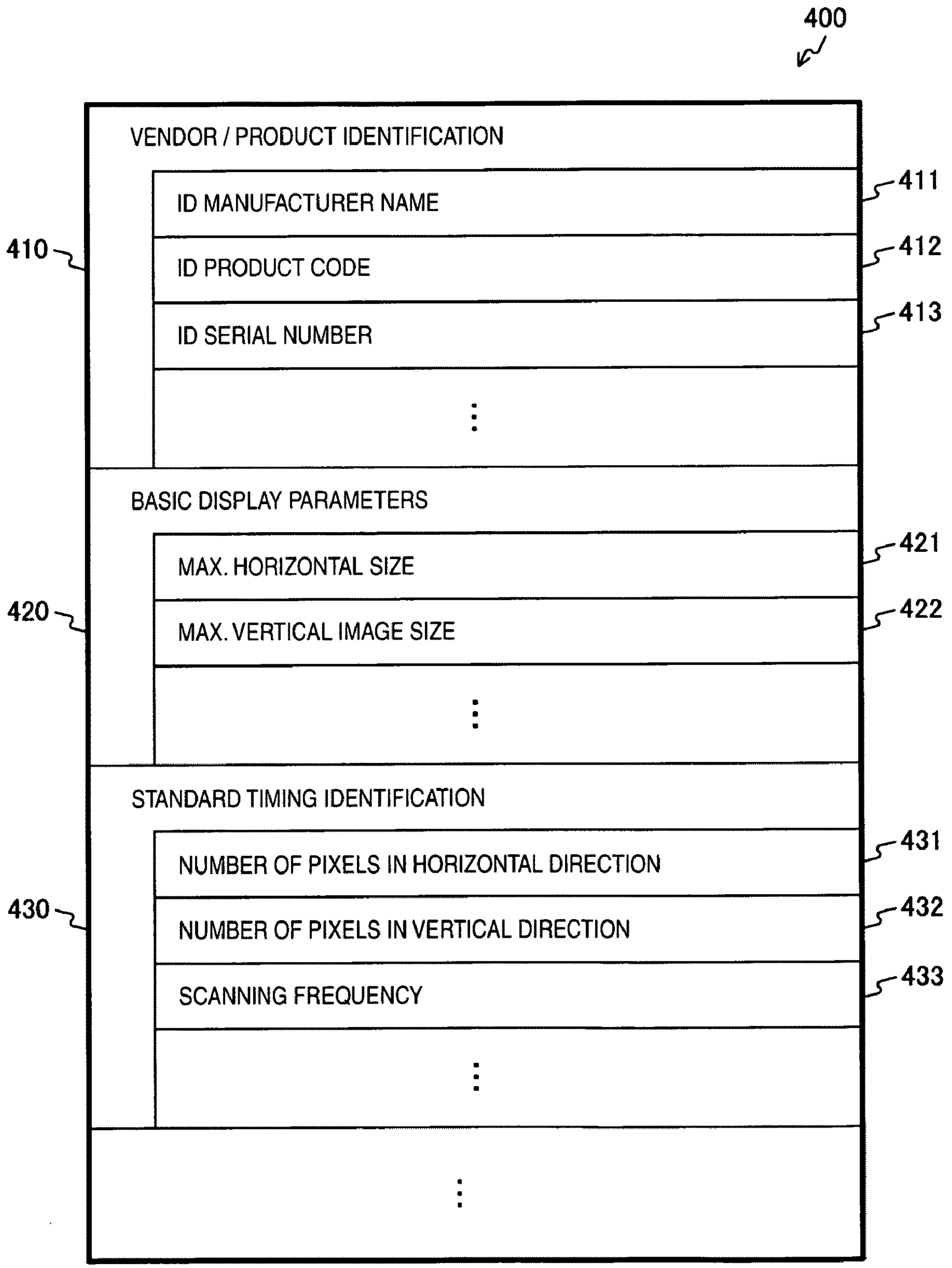
FIG. 10 is a schematic diagram of a storage format 400 for EDID information.

FIG. 10 is a schematic diagram of a storage format 400 for EDID information. The storage format 400 for EDID information includes items such as Vender/Product Identification 410, Basic Display Parameters 420, and Standard Timing Identification 430. The Vendor/Product Identification 410 includes information such as an ID Manufacturer Name 411, an ID Product Code 412, and an ID Serial Number 413. The Basic Display Parameters 420 includes information such as a Max. Horizontal Image Size 421 and a Max. Vertical Image Size 422. The Standard timing Identification 430 includes information such as the number of pixels in horizontal direction 431, the number of pixels in vertical direction 432, and a scanning frequency 433.

Consequently, in this embodiment, the viewing-condition determining unit 280 receives, as screen information, the Max. Vertical Image Size 422 and the number of pixels in vertical direction 432 among the EDID information via the display data channel. The viewing-condition determining unit 280 calculates, as a viewing condition, a viewing distance from the Max. Vertical Image Size 422 and calculates, as a viewing condition, pixel density from the Max. Vertical Image Size 422 and the number of pixels in vertical direction 432. The viewing-condition determining unit 280 acquires screen information via the display data channel 335. However, when the Max. Vertical Image Size 422 and the number of pixels in vertical direction 432 are not stored in the EDID ROM 322, the viewing-condition determining unit 280 acquires screen information via the CEC line 336. When it is still difficult to acquire one of both of these kinds of screen information, the viewing-condition determining unit 280 calculates viewing conditions using values decided in advance.

FIGS. 11A and 11B are tables of a storage format example of the filter-coefficient storing unit 270 according to this embodiment. FIG. 11A is a correspondence table of spatial frequencies corresponding to viewing conditions (pixel density and a viewing distance) in a 40-inch display screen with an aspect ratio of 16:9. FIG. 11B is a correspondence table of filter coefficients corresponding to the spatial frequencies decided from the correspondence table shown in FIG. 11A. In FIG. 11A, spatial frequencies calculated from relations between pixel densities 511 to 513 and viewing distances 521 to 522 are stored. The vertical length of the screen is represented by V. The pixel densities 511 to 513 are calculated by dividing the vertical length V of the screen by the number of pixels in the vertical direction. For example, the pixel density 511 is represented by V/1080 because the number of pixels of the display apparatus 30 is 1920×1080 (in the horizontal and vertical directions). The viewing distances 521 and 522 are obtained by multiplying the vertical length V of the screen with 2.5 and 3.0 and are represented by 2.5V and 3V, respectively. In FIG. 11B, filter coefficients G corresponding to spatial frequencies 531 to 533 decided from the correspondence table shown in FIG. 11A are stored.

As explained above, the filter-coefficient storing unit 270 is configured to store the correspondence table between the viewing conditions and the spatial frequencies shown in FIG. 11A and the correspondence table between the spatial frequencies and the filter coefficients shown in FIG. 11B. Therefore, the filter-coefficient setting unit 260 acquires a filter coefficient stored in the filter-coefficient storing unit 270 according to viewing conditions supplied from the viewing-condition determining unit 280 and sets the filter coefficient in the feedback arithmetic unit 240. As an example, the filter-coefficient storing unit 270 is configured to acquire, after specifying a spatial frequency from the viewing conditions, a filter coefficient corresponding to the spatial frequency. However, the filter-coefficient storing unit 270 may be configured to directly acquire a filter coefficient from the viewing conditions. A specific storage format for filter coefficients is explained with reference to subsequent drawings.

FIG. 12 is a diagram of a modification of the storage format of the filter-coefficient storing unit 270 according to this embodiment. In FIG. 12, instead of spatial frequencies calculated from relations between pixel densities 541 to 543 and viewing distances 551 and 552 in the 40-inch display screen with an aspect ratio of 16:9, filter coefficients G corresponding to the spatial frequencies are directly stored. Items of the pixel densities 541 to 543 and the viewing distances 551 and 552 are the same as those shown in FIG. 11A. Therefore, explanation of the items is omitted.

As explained above, the filter-coefficient storing unit 270 may be configured to store a correspondence table shown in FIG. 12. However, in such a configuration, when there are plural viewing conditions in which spatial frequencies are the same, same filter coefficients are redundantly stored.

Figure 13:
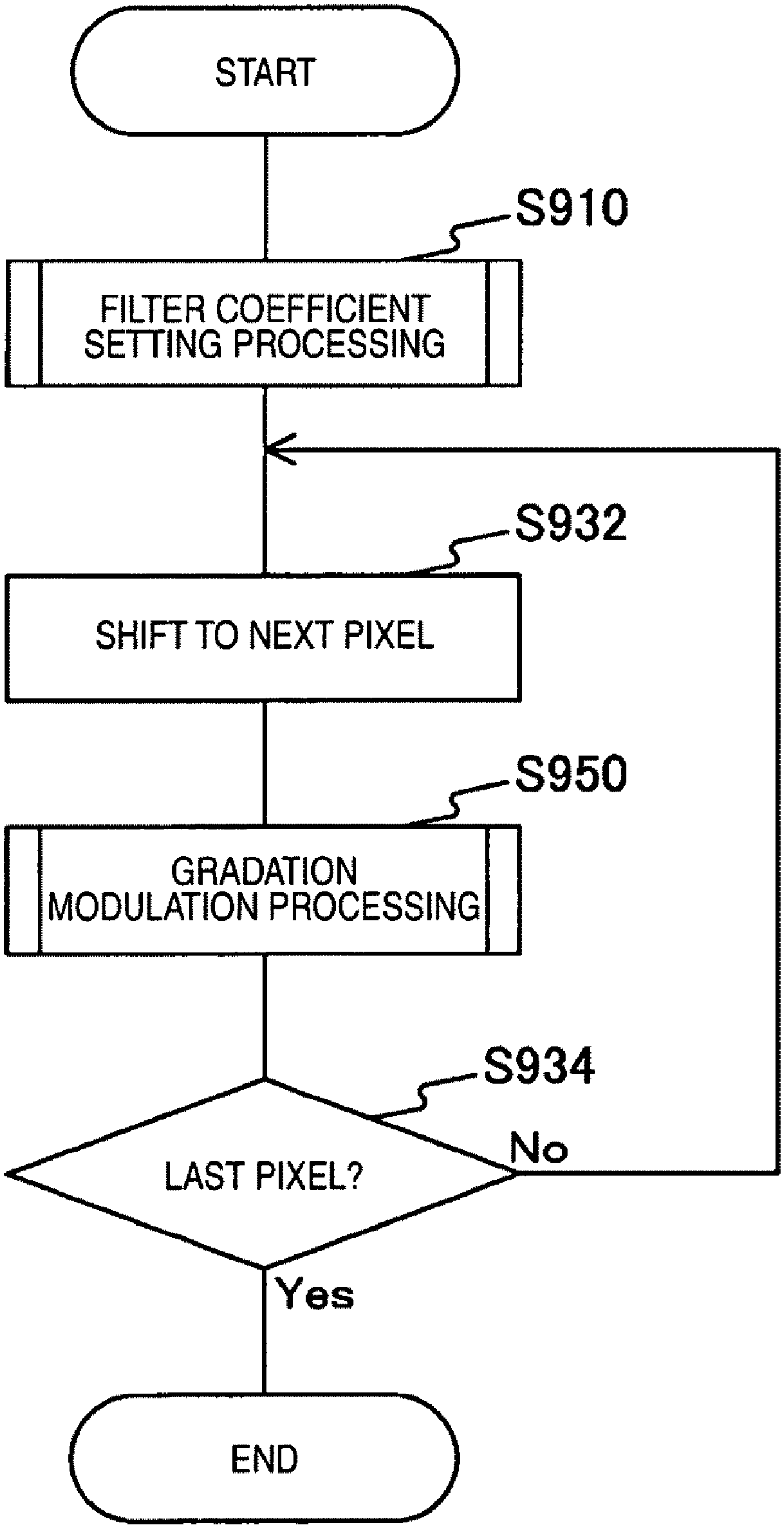
FIG. 13 is a flowchart of a processing procedure example of an image processing method according to the embodiment.

FIG. 13 is a flowchart of a processing procedure example of an image processing method according to this embodiment. In this embodiment, first, the reproducing apparatus 10 performs filter coefficient setting processing on the basis of the viewing conditions supplied from the viewing-condition determining unit 280 (step S910). Subsequently, the reproducing apparatus 10 applies processing to the respective pixels in the directions from the left to the right and from the top to the bottom of the image signal (step S932). The reproducing apparatus 10 performs gradation modulation processing by the gradation modulator 200 (step S950). The reproducing apparatus 10 applies this processing to the pixels one by one. When the processing for the last pixel of the image signal is finished, the reproducing apparatus 10 finishes the processing for the image signal (step S934).

Figure 14:
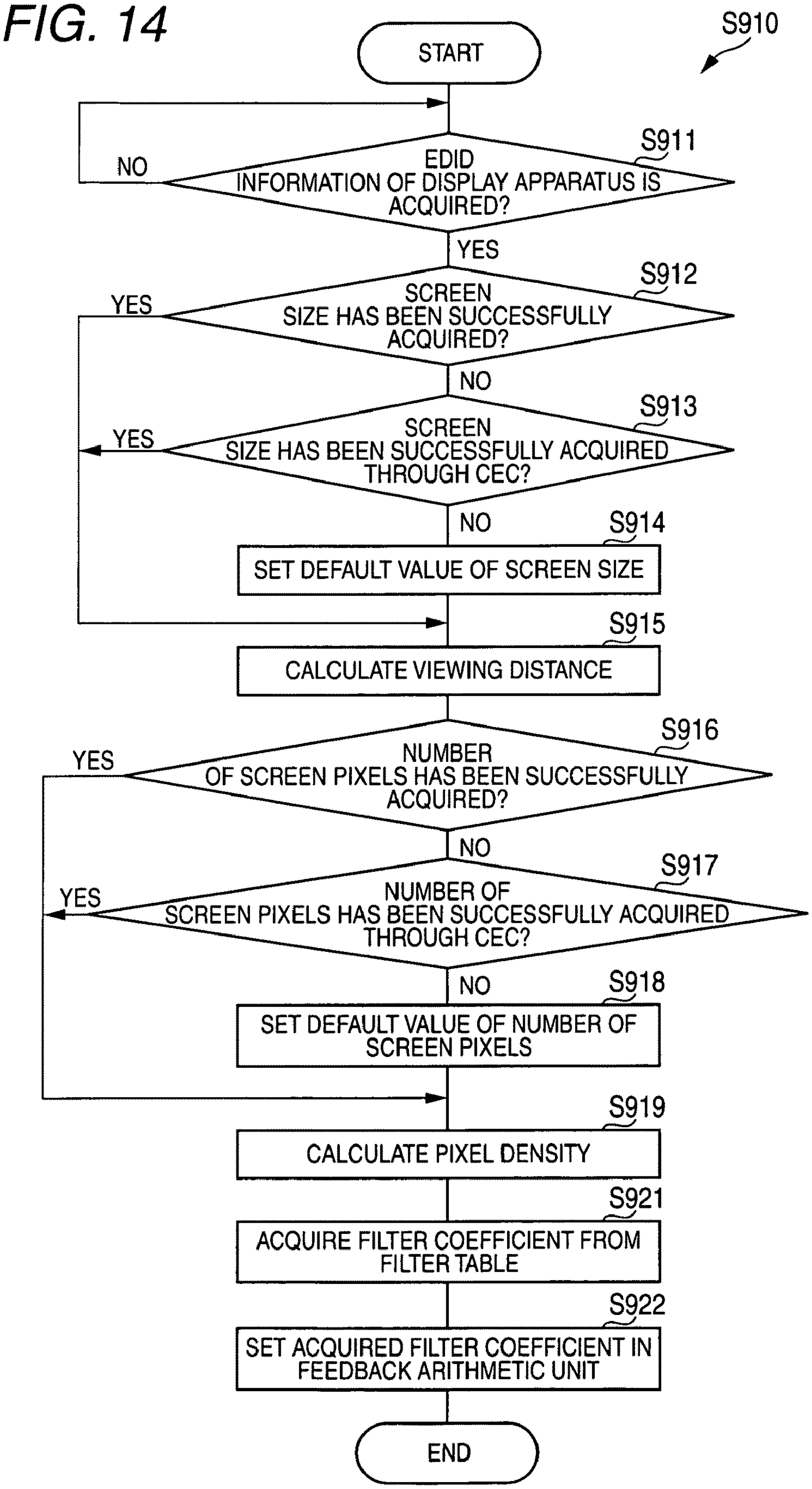
FIG. 14 is a flowchart of a processing procedure example of filter coefficient setting processing (step S910) according to the embodiment.

FIG. 14 is a flowchart of a processing procedure example of the filter coefficient setting processing (step S910) according to this embodiment. The reproducing apparatus 10 establishes communication between the reproducing apparatus 10 and the display apparatus 30 via the digital transmission interface 18 and determines whether EDID information of the display apparatus 30 has been successfully acquired in the display data channel 335 (step S911). The reproducing apparatus 10 repeats the processing in step S911 until the EDID information is received. On the other hand, when the EDID information has been successfully acquired, the reproducing apparatus 10 determines whether information indicating the vertical length of the screen has been successfully acquired (step S912). When the information has not been successfully acquired, the reproducing apparatus 10 establishes communication through the CEC line 336 and determines whether the information indicating the vertical length of the screen has been successfully acquired through the CEC line 336 (step S913). When the information has not been successfully acquired through the CEC line 336 either, the reproducing apparatus 10 calculates, with the viewing-condition determining unit 280, a viewing distance (step S915) using a default value of the vertical length of the screen (step S914). On the other hand, when the information indicating the vertical length of the screen has been successfully acquired in step S912 or S913, the reproducing apparatus 10 calculates, with the viewing-condition determining unit 280, a viewing distance using the information indicating the vertical length of the screen.

Subsequently, the reproducing apparatus 10 determines whether information indicating the number of pixels in the vertical direction of the screen has been successfully acquired (step S916). When the information has not been successfully acquired, the reproducing apparatus 10 establishes communication through the CEC line 336 and determines whether the information indicating the number of pixels in the vertical direction of the screen has been successfully acquired through the CEC line 336 (step S917). When the information has not been successfully acquired through the CEC line 336 either, the reproducing apparatus 10 calculates, with the viewing-condition determining unit 280, pixel density from a default value of the number of pixels in the vertical direction of the screen (step S918) and the information indicating the vertical length of the screen used in step S915 (step S919). On the other hand, when the information indicating the number of pixels in the vertical direction of the screen has been successfully acquired in step S916 or S917, the reproducing apparatus 10 calculates, with the viewing-condition determining unit 280, pixel density from the information indicating the number of pixels in the vertical direction of the screen and the information indicating the vertical length of the screen used in step S915 (step S919).

The reproducing apparatus 10 acquires, with the filter-coefficient setting unit 260, a filter coefficient corresponding to the calculated viewing distance and pixel density among the filter coefficient stored in the filter-coefficient storing unit 270 (step S921). The reproducing apparatus 10 sets, with the filter-coefficient setting unit 260, the filter coefficient acquired in this way in the feedback arithmetic unit 240 (step S922).

Figure 15:
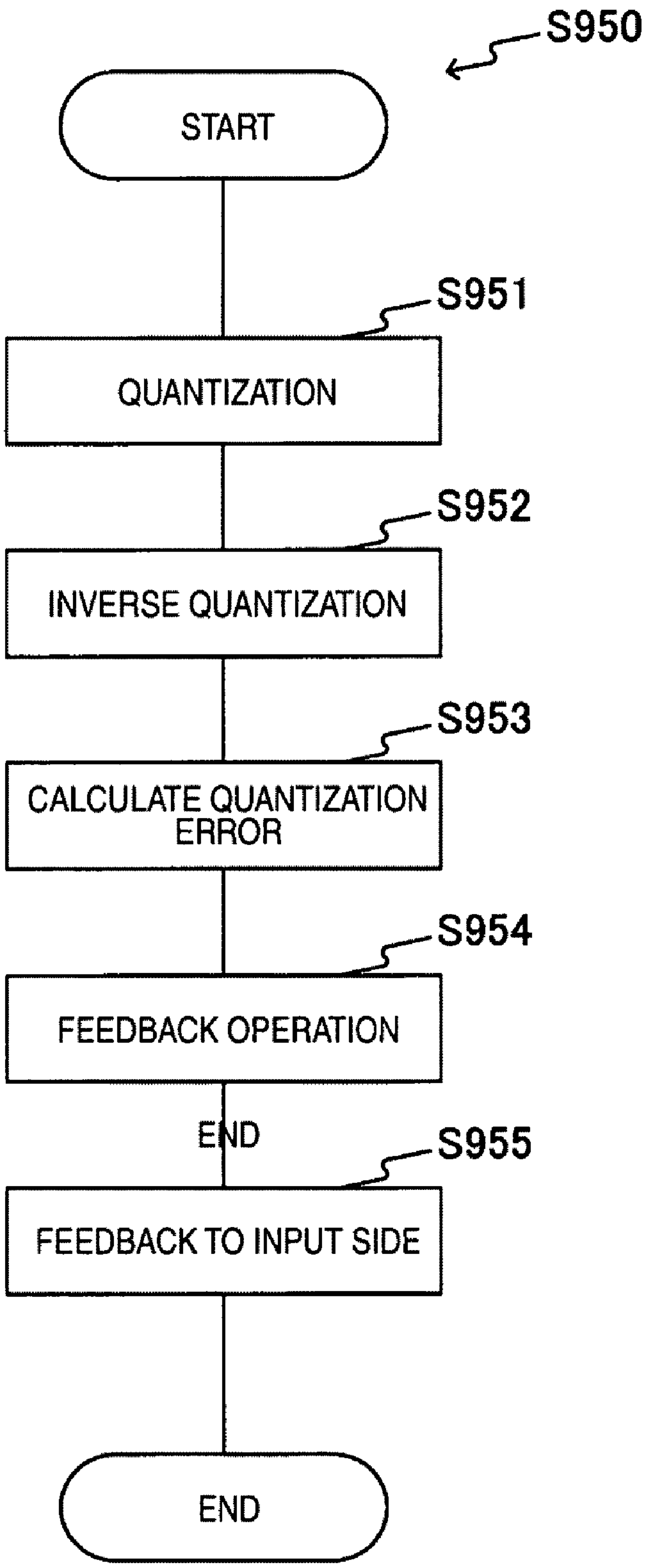
FIG. 15 is a flowchart of a processing procedure example of gradation modulation processing (step S950) according to the embodiment.

FIG. 15 is a flowchart of a processing procedure example of the gradation modulation processing (step S950) according to this embodiment. The reproducing apparatus 10 quantizes, with the quantizing unit 210, the output of the adder 250 (step S951) and outputs the quantized output as an output signal OUT(x,y). The reproducing apparatus 10 inversely quantizes, with the inverse quantization unit 220, the quantized output signal OUT (x,y) (step S952).

The reproducing apparatus 10 calculates a quantized error Q(x,y) by calculating, with the subtracter 230, a difference between a signal before the quantization by the quantizing unit 210 and a signal inversely quantized by the inverse quantization unit 220 (step S953).

The reproducing apparatus 10 accumulates the quantized error Q(x,y) calculated in this way and uses, with the feedback arithmetic unit 240, the quantized error Q(x,y) for calculation of a feedback value (step S954). The reproducing apparatus 10 feeds back the feedback value calculated in this way to the adder 250 (step S955).

A first modification of the embodiment of the present invention is explained with reference to the drawings. In the example explained with reference to FIG. 2, the screen information concerning the viewing conditions is acquired via the digital transmission interface 18. However, in an explanation explained below, the screen information is acquired via the network interface 19.

Figure 16:
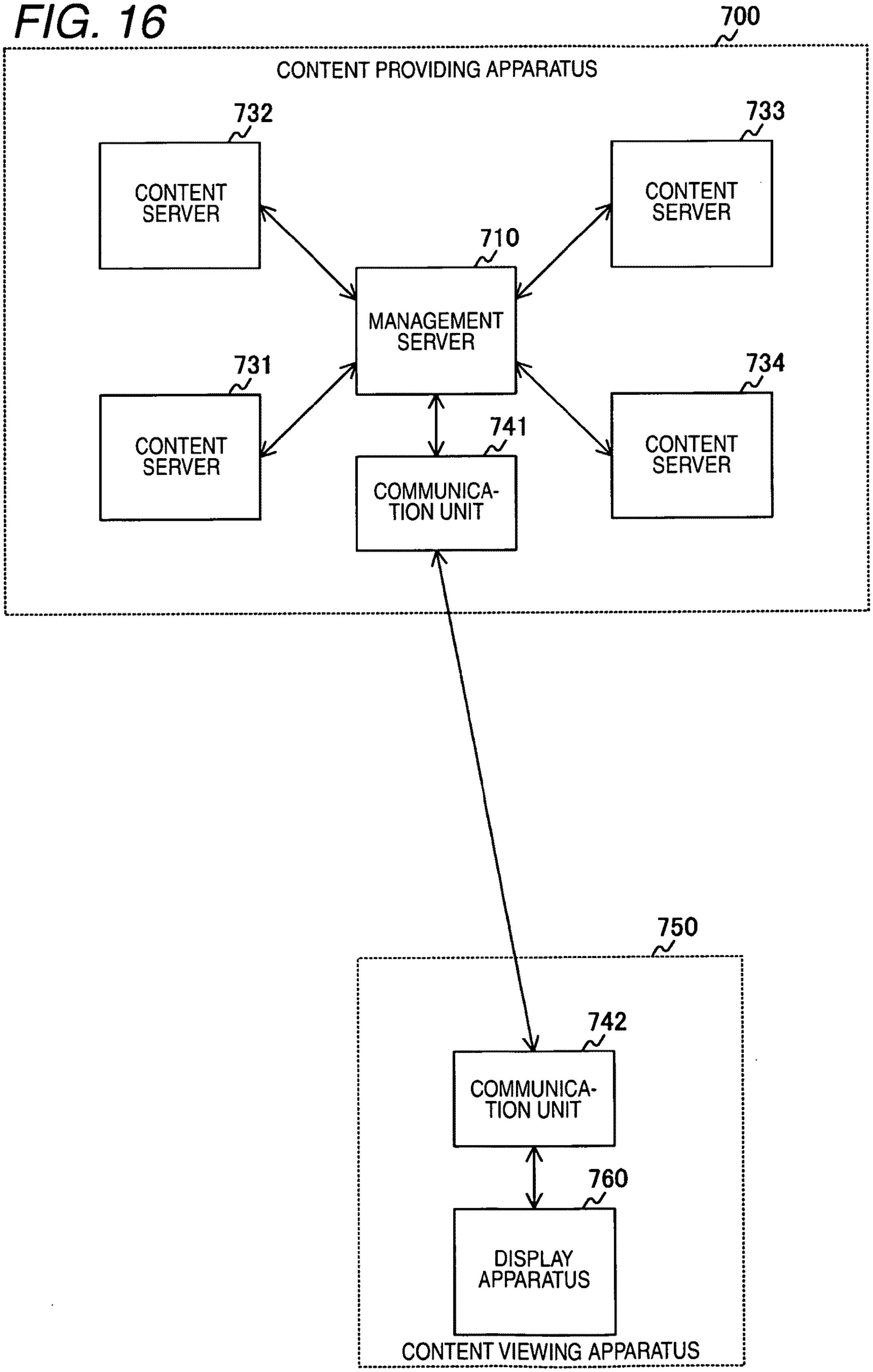
FIG. 16 is a diagram of a configuration example of a content provision system according to a first modification of the embodiment.

FIG. 16 is a diagram of a configuration example of a content provision system according to the first modification. It is assumed that a content viewing apparatus 750 accesses a content providing apparatus 700 and views contents through an external network. The content providing apparatus 700 includes a management server 710, content servers 731 to 734, and a communication unit 741. The content viewing apparatus 750 includes a communication unit 742 and a display apparatus 760.

The management server 710 unitarily manages the content servers 731 to 734. The management server 710 acquires content data from the content servers 731 to 734 in response to a request from the content viewing apparatus 750 and transmits the content data to the content viewing apparatus 750. Specifically, the management server 710 acquires screen information concerning viewing conditions from the display apparatus 760 and, as explained with reference to FIG. 4, sets, in the gradation modulator 200, the filter coefficient selected on the basis of the viewing conditions calculated from the screen information and performs the gradation modulation processing. The management server 710 transmits an image signal subjected to other predetermined image processing to the content viewing apparatus 750. The content servers 731 to 734 store content data and supply the stored content data to the management server 710 in response to a request from the management server 710.

The communication units 741 and 742 perform communication between the viewing apparatus 750 and the content providing apparatus 700 via a network such as the Internet.

The display apparatus 760 displays the image signal transmitted from the content providing apparatus 700 on a display screen.

Figure 17:
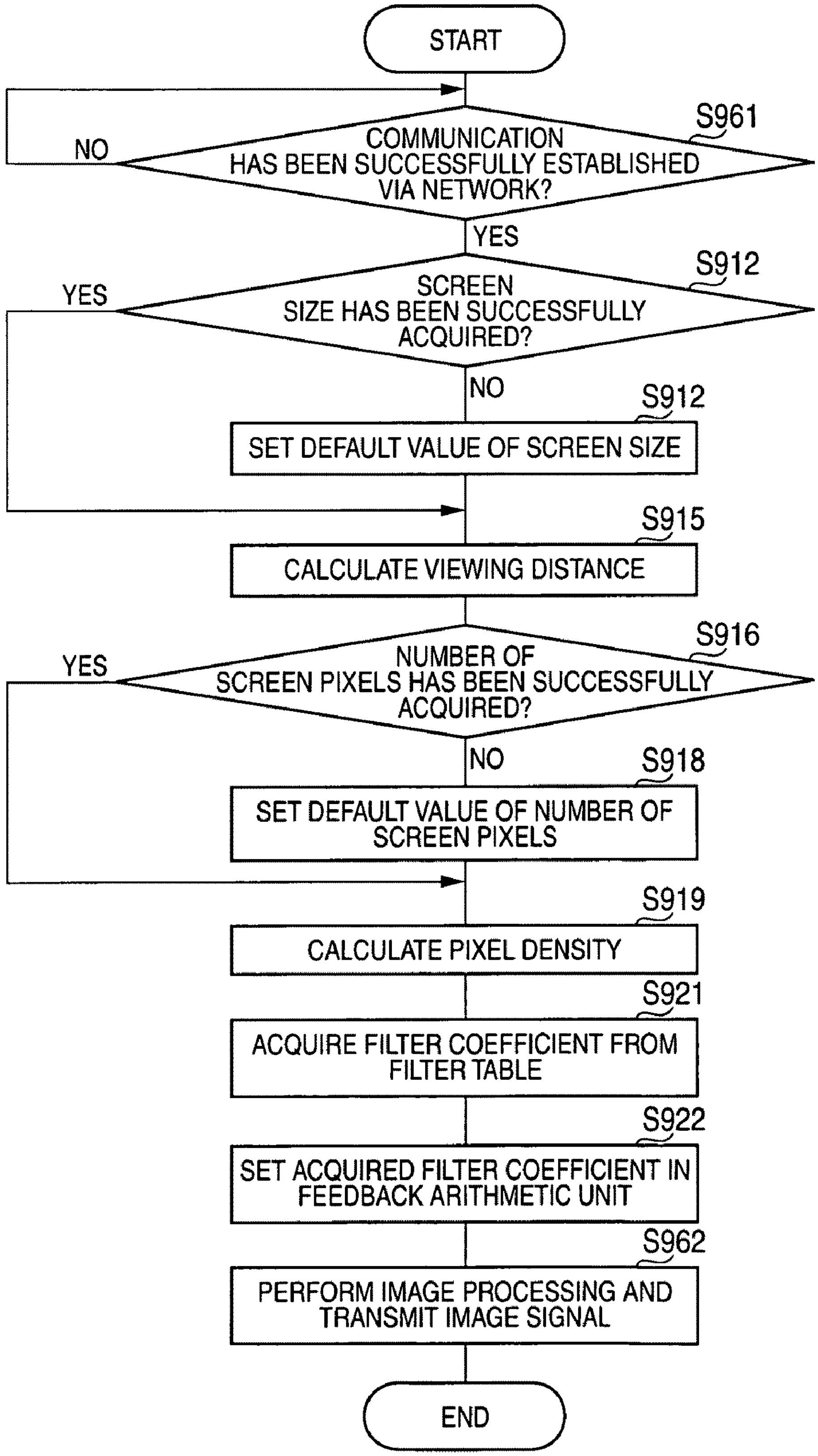
FIG. 17 is a flowchart of a processing procedure example of filter coefficient setting processing according to the first modification of the embodiment.

FIG. 17 is a flowchart of a processing procedure example of filter coefficient setting processing according to the first modification of the embodiment. Processing except steps S961 and S962 is the same as that shown in FIG. 14. Therefore, explanation of the processing is omitted. In this case, since the processing procedure is a processing procedure for acquiring screen information through the network interface, the processing by the CEC line 336 (steps S913 to S917) is excluded. The reproducing apparatus 10 determines whether communication has been successfully established between the reproducing apparatus 10 and the display apparatus 760 via the network interface. When the communication has been successfully established (step S961), the reproducing apparatus 10 proceeds to step S912.

Thereafter, in step S922, after setting the acquired filter coefficient in the feedback arithmetic unit 240, the reproducing apparatus 10 performs the gradation modulation processing and transmits an image signal subjected to other predetermined image processing to the display apparatus 760 (step S962).

Consequently, the management server 710 can transmit the image signal, which is subjected to the gradation modulation processing on the basis of the screen information concerning the viewing conditions from the display apparatus 760, to the display apparatus 760 connected to the network such as the Internet.

A second modification of the embodiment is explained with reference to the drawings. In the example explained with reference to FIG. 16, the screen information concerning the viewing conditions is acquired via the network interface. In an example explained below, screen information is acquired according to a manufacturing number of a display apparatus on the assumption that it is difficult to acquire the screen information.

Figure 18:
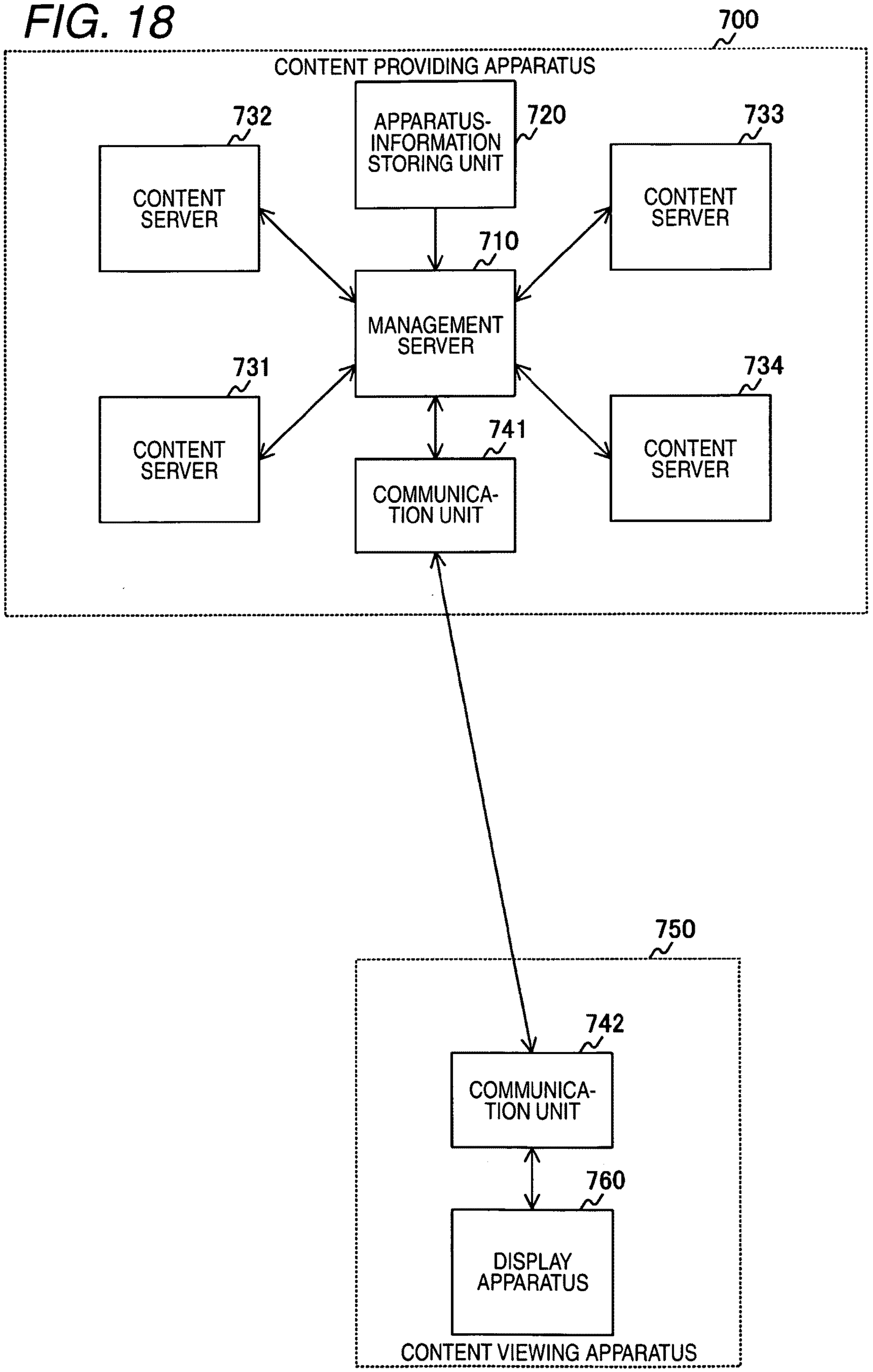
FIG. 18 is a diagram of a configuration example of a content provision system according to a second modification of the embodiment.
Figure 20:
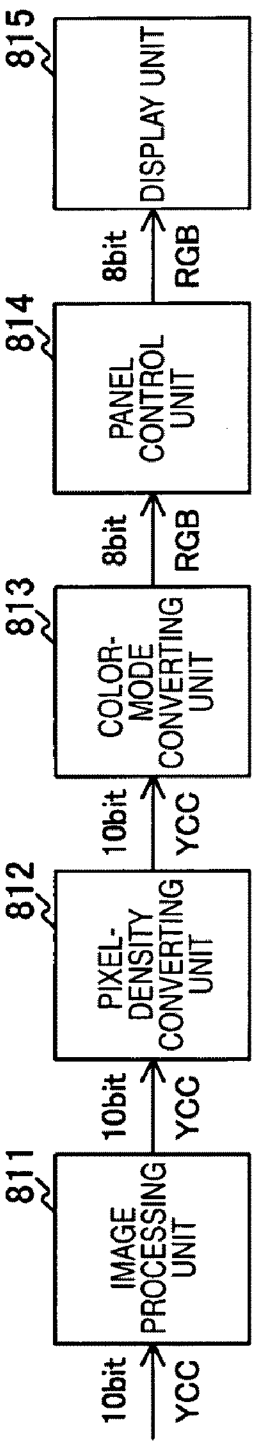
FIG. 20 is a block diagram of the numbers of processing bits of respective components and the numbers of bits on a bus until a digital image is displayed on a display apparatus.
Figure 21:
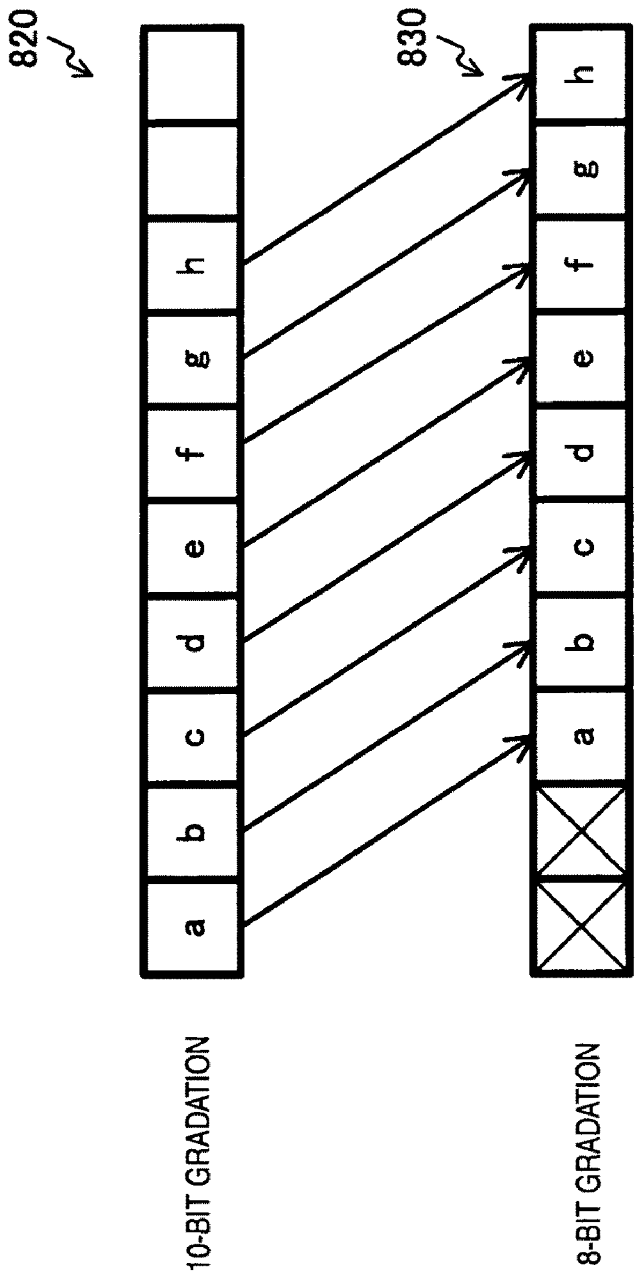
FIG. 21 is a diagram of gradation conversion from 10 bits to 8 bits by bit shift.
Figure 22A:
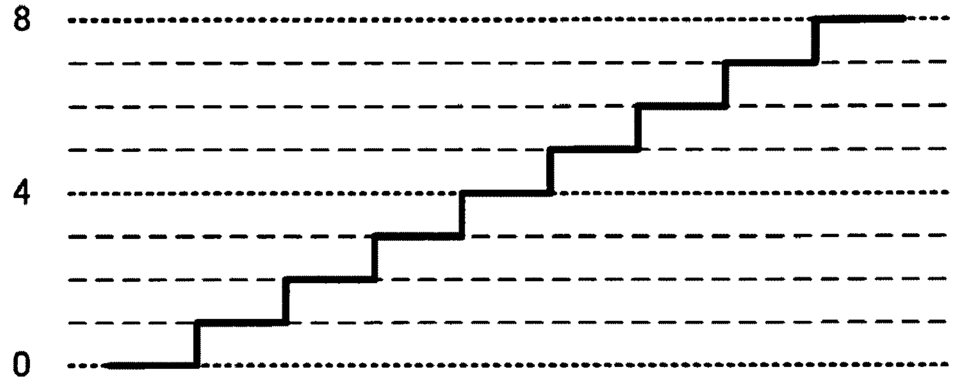
FIGS. 22A to 22C are graphs of changes in pixel values that change when PDM noise is added to the bit shift from 10 bits to 8 bits.
Figure 22B:
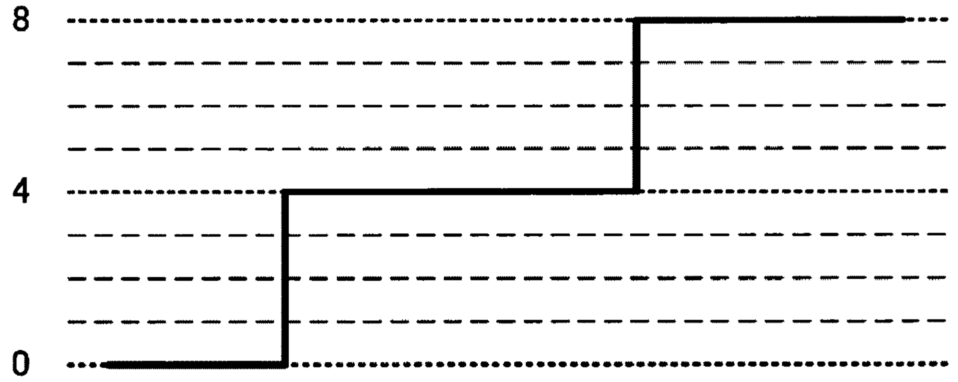
Figure 22C:
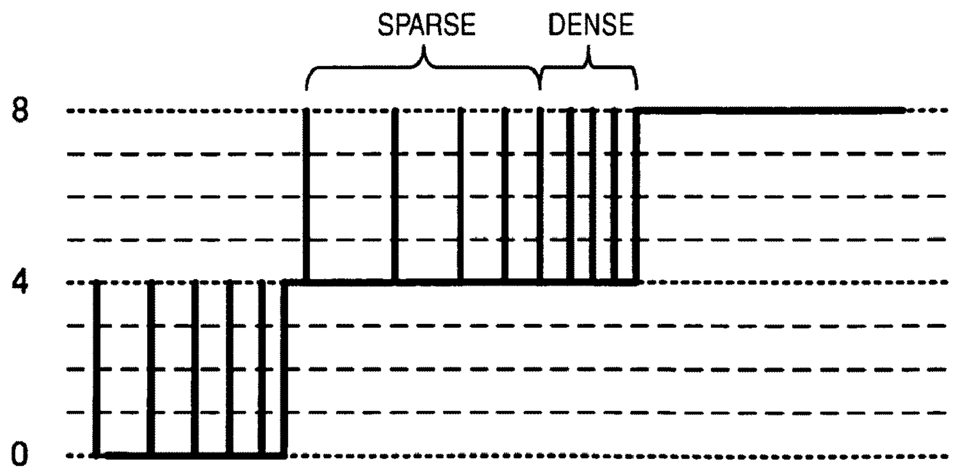
Figure 23A:
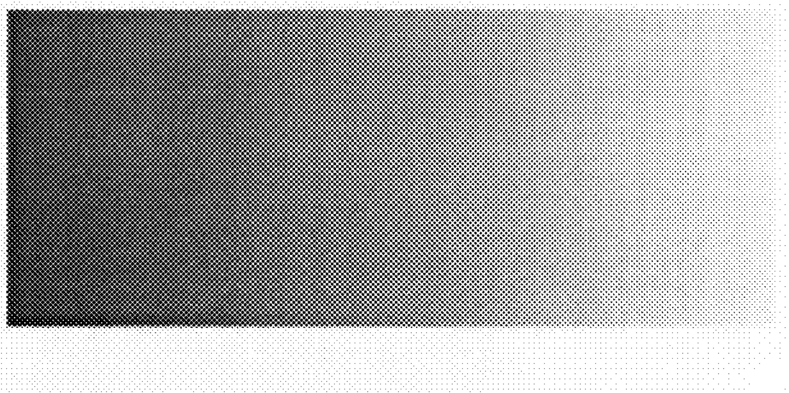
FIGS. 23A to 23D are diagrams of images formed when the PDM noise is added to the bit shift from 10 bits to 8 bits.
Figure 23B:
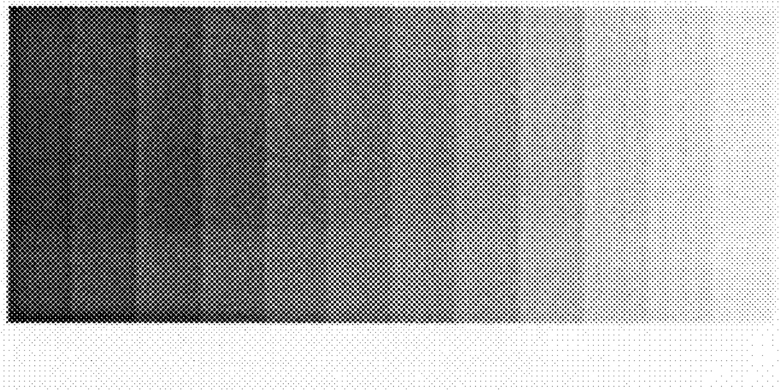
Figure 23C:
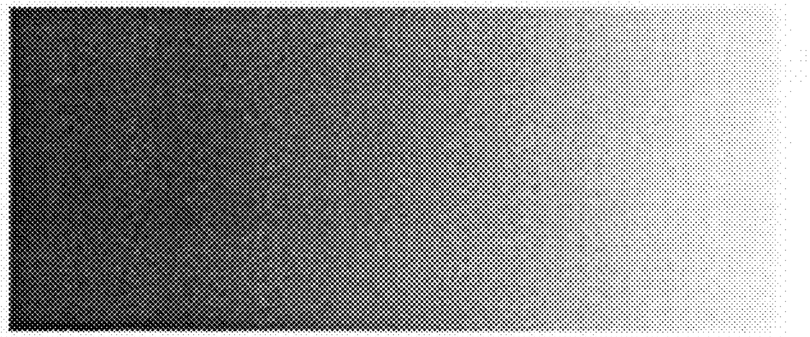
Figure 23D:
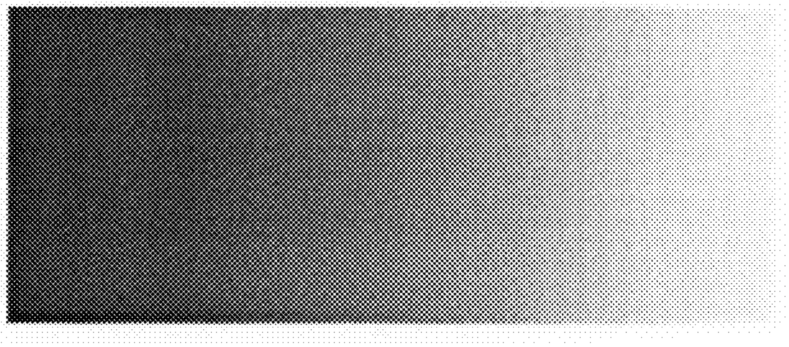

FIG. 18 is a diagram of a configuration example of a content provision system according to the second modification of the embodiment. In the content providing apparatus 700 of the content provision system, an apparatus-information storing unit 720 is added to the content providing apparatus 700 shown in FIG. 16. Functional components other than the management server 710 and the apparatus-information storing unit 720 are the same as those shown in FIG. 16. Therefore, explanation of the components is omitted.

The apparatus-information storing unit 720 stores a manufacturing number of a display apparatus and screen information concerning viewing conditions in association with each other.

When it is difficult to acquire one or both of the pieces of screen information concerning the viewing conditions from the display apparatus 760, the management server 710 acquires a manufacturing number from the display apparatus 760 and acquires screen information corresponding to the manufacturing number from the apparatus-information storing unit 720. Functions other than this function are the same as those of the management server 710 explained with reference to FIG. 16. Therefore, explanation of the functions is omitted.

FIG. 19 is a diagram of a storage form example of the apparatus-information storing unit 720 according to the second modification of the embodiment. The apparatus-information storing unit 720 stores fields for a manufacturer name 781, a manufacturing number 782, the number of pixels 783, and a screen size 784. The number of pixels 783 and the screen size 784 correspond to the screen information. In the example explained above, the screen information concerning the viewing conditions is stored in association with the manufacturing number. However, viewing conditions calculated from the screen information may be stored in association with the manufacturing number.

Since the apparatus-information storing unit 720 is provided in this way, when it is difficult to obtain the screen information concerning the viewing conditions from the display apparatus 760, the management server 710 acquires the manufacturing number from the display apparatus 760. Therefore, the management server 710 can acquire screen information from the manufacturing number and perform gradation modulation processing suitable for the display apparatus 760.

As explained above, according to this embodiment, when the gradation modulation processing is performed, a filter coefficient is selected on the basis of the viewing conditions, which are calculated according to the screen information from the display apparatus 30 that displays an image signal, and set in the feedback arithmetic unit 240. This makes it possible to modulate quantization errors to a band with sufficiently low sensitivity with respect to the human visual characteristic.

Consequently, for example, even if bit widths of respective pixel values of a liquid crystal panel of a television are 8 bits, an image quality equivalent to 12 bits can be represented. Even if an input signal to the television is an 8-bit signal, bit length can be expanded to 8 bits or more by various kinds of image processing. For example, 8-bit image is expanded to 12 bits by noise reduction. When the bit widths of the respective pixel values of the liquid crystal panel are 8 bits, 12-bit data needs to be quantized to 8 bits. In this case, an image quality equivalent to 12 bits can be represented by the 8-bit liquid crystal panel by applying the present invention. The present invention can be applied in a transmission line in the same manner. For example, when a transmission line from a video apparatus to a television has 8-bit width, if a 12-bit image signal in the video apparatus is converted into 8 bits according to the present invention and transferred to the television, an image quality equivalent to 12 bits can be viewed on the television side.

The embodiment of the present invention indicates an example for embodying the present invention. The embodiment has correspondence relations with the respective elements explained above in the section of the summary of the invention. However, the present invention is not limited to this. Various modifications are possible without departing from the spirit of the present invention.

The filter-coefficient storing means corresponds to, for example, the filter-coefficient storing unit 270. The viewing-condition determining means corresponds to, for example, the viewing-condition determining unit 280. The filter-coefficient setting means corresponds to, for example, the filter-coefficient setting unit 260. The gradation modulating means corresponds to, for example, the gradation modulator 200. The quantizing means corresponds to, for example, the quantizing unit 210. The filter coefficient corresponds to, for example, the filter coefficient G of the filter-coefficient storing unit 270.

The number of pixels corresponds to, for example, the number of pixels 432 or the number of pixels 783 in the vertical direction. The screen size corresponds to, for example, the vertical length 422 or the screen size 784.

The inverse quantization means corresponds to, for example, the inverse quantization unit 220. The difference generating means corresponds to, for example, the subtracter 230. The arithmetic means corresponds to, for example, the feedback arithmetic unit 240. The adding means corresponds to, for example, the adder 250.

The viewing condition determining step corresponds to, for example, steps S912 to S919. The filter coefficient setting step corresponds to, for example, steps S921 and S922.

The processing procedures explained in the embodiment may be grasped as a method having the series of procedures or may be grasped as a computer program for causing a computer to execute these series of procedures or a storage medium that stores the computer program.

It should be understood by those skilled in the art that various modifications, combinations, sub-combinations, and alterations may occur depending on design requirements and other factors insofar as they are within the scope of the appended claims or the equivalents thereof.

What is claimed is:

1. An image processing apparatus comprising:

filter-coefficient storing means for storing filter coefficients respectively associated with spatial frequencies, which are numbers of strips displayed per unit angle with respect to an angle of field of a display apparatus;

viewing-condition determining means for determining, as viewing conditions, a viewing distance between a viewer and the display apparatus and pixel density of the display apparatus from screen information concerning the viewing conditions acquired from the display apparatus through communication between the image processing apparatus and the display apparatus established by the image processing apparatus via an interface of the image processing apparatus, wherein, when a determination is the screen information is not acquired by the communication between the image processing apparatus and the display apparatus, the viewing conditions are determined by the view-condition determining means based on stored information corresponding to the screen information;

filter-coefficient setting means for setting a filter coefficient selected on the basis of a spatial frequency calculated from the viewing conditions among the stored filter coefficients; and gradation modulating means including quantizing means for quantizing a pixel value in a predetermined coordinate position in an image signal and outputting the pixel value as a quantized pixel value in the predetermined coordinate position, the gradation modulating means gradation-modulating the image signal by multiply-accumulating a set filter coefficient with respect to quantization errors caused by the quantizing means to feed back the quantization errors to an input side of the quantizing means.

2. An image processing apparatus according to claim 1, wherein the viewing-condition determining means receives a number of pixels and a screen size of the display apparatus from the display apparatus and determines the viewing conditions on the basis of the number of pixels and the screen size.

3. An image processing apparatus according to claim 1, wherein the viewing-condition determining means receives the pixel density and a screen size of the display apparatus from the display apparatus and determines the viewing conditions on the basis of the pixel density and the screen size.

4. An image processing apparatus according to claim 1, wherein the filter coefficient is set to reduce the quantized error of frequency components lower than a predetermined spatial frequency.

5. An image processing apparatus according to claim 4, wherein the predetermined spatial frequency is about two third of a maximum frequency in the spatial frequency.

6. An image processing apparatus according to claim 1, wherein the gradation modulating means further includes:

inverse quantization means for inversely quantizing the quantized pixel value in the predetermined coordinate position and outputting the quantized pixel value as an inversely quantized pixel value in the predetermined coordinate position;

differential generating means for generating, as quantization errors in the predetermined coordinate position, a difference value between the quantized pixel value in the predetermined coordinate position and the inversely quantized pixel value in the predetermined coordinate position;

arithmetic means for calculating, as a feedback value in the predetermined coordinate position, a value obtained by multiplying the respective quantization errors in a predetermined area corresponding to the predetermined coordinate position with the set filter coefficient and adding up the quantization errors; and adding means for adding the feedback value in the predetermined coordinate position to the corrected pixel value in the predetermined coordinate position.

7. A filter coefficient setting processing method for an image processing apparatus including a display apparatus, filter-coefficient storing means for storing filter coefficients respectively associated with spatial frequencies, which are numbers of strips displayed per unit angle with respect to an angle of field of a display apparatus, and gradation modulating means including quantizing means for quantizing a pixel value in a predetermined coordinate position in a pixel signal and outputting the pixel value as a quantized pixel value in the predetermined coordinate position, the gradation modulating means gradation-modulating the image signal by multiply-accumulating a set filter coefficient with respect to quantization errors caused by the quantizing means to feed back the quantization errors to an input side of the quantizing means, the method comprising the steps of:

determining, as viewing conditions, a viewing distance between a viewer and the display apparatus and pixel density of the display apparatus from screen information concerning the viewing conditions acquired from the display apparatus through communication with the display apparatus established by the image processing apparatus via an interface of the image processing apparatus, wherein, when a determination is the screen information is not acquired by the communication with the display apparatus, the viewing conditions are determined based on stored information corresponding to the screen information; and setting, in the gradation modulating means, a filter coefficient selected on the basis of a spatial frequency calculated from the viewing conditions among the filter coefficients stored in the filter-coefficient storing means.

8. A non-transitory storage medium on which is stored a computer program for causing a computer to execute, in an image processing apparatus including a display apparatus, filter-coefficient storing means for storing filter coefficients respectively associated with spatial frequencies, which are numbers of strips displayed per unit angle with respect to an angle of field of a display apparatus, and gradation modulating means including quantizing means for quantizing a pixel value in a predetermined coordinate position in a pixel signal and outputting the pixel value as a quantized pixel value in the predetermined coordinate position, the gradation modulating means gradation-modulating the image signal by multiply-accumulating a set filter coefficient with respect to quantization errors caused by the quantizing means to feed back the quantization errors to an input side of the quantizing means:

a viewing-condition determining step of determining, as viewing conditions, a viewing distance between a viewer and the display apparatus and pixel density of the display apparatus from screen information concerning the viewing conditions acquired from the display apparatus through communication with the display apparatus established by the image processing apparatus via an interface of the image processing apparatus, wherein, when a determination is the screen information is not acquired by the communication with the display apparatus, the viewing conditions are determined by the view-condition determining step based on stored information corresponding to the screen information; and a filter-coefficient setting step of setting, in the gradation modulating means, a filter coefficient selected on the basis of a spatial frequency calculated from the viewing conditions among the filter coefficients stored in the filter-coefficient storing means.

9. An image processing apparatus comprising:

a filter-coefficient storing unit storing filter coefficients respectively associated with spatial frequencies, which are numbers of strips displayed per unit angle with respect to an angle of field of a display apparatus;

a viewing-condition determining unit determining, as viewing conditions, a viewing distance between a viewer and the display apparatus and pixel density of the display apparatus from screen information concerning the viewing conditions acquired from the display apparatus through communication between the image processing apparatus and the display apparatus established by the image processing apparatus via an interface of the image processing apparatus, wherein, when a determination is the screen information is not acquired by the communication between the image processing apparatus and the display apparatus, the viewing conditions are determined by the view-condition determining unit based on stored information corresponding to the screen information;

a filter-coefficient setting unit setting a filter coefficient selected on the basis of a spatial frequency calculated from the viewing conditions among the stored filter coefficients; and a gradation modulating unit including a quantizing unit quantizing a pixel value in a predetermined coordinate position in an image signal and outputting the pixel value as a quantized pixel value in the predetermined coordinate position, the gradation modulating unit gradation-modulating the image signal by multiply-accumulating a set filter coefficient with respect to quantization errors caused by the quantizing unit to feed back the quantization errors to an input side of the quantizing unit.

10. An image processing apparatus according to claim 9, wherein the viewing-condition determining unit receives a number of pixels and a screen size of the display apparatus from the display apparatus and determines the viewing conditions on the basis of the number of pixels and the screen size.

11. An image processing apparatus according to claim 9, wherein the viewing-condition determining unit receives the pixel density and a screen size of the display apparatus from the display apparatus and determines the viewing conditions on the basis of the pixel density and the screen size.

12. An image processing apparatus according to claim 9, wherein the filter coefficient is set to reduce the quantized error of frequency components lower than a predetermined spatial frequency.

13. An image processing apparatus according to claim 12, wherein the predetermined spatial frequency is about two third of a maximum frequency in the spatial frequency.

14. An image processing apparatus according to claim 9, wherein the gradation modulating unit further includes:

an inverse quantization unit inversely quantizing the quantized pixel value in the predetermined coordinate position and outputting the quantized pixel value as an inversely quantized pixel value in the predetermined coordinate position;

a differential generating unit generating, as quantization errors in the predetermined coordinate position, a difference value between the quantized pixel value in the predetermined coordinate position and the inversely quantized pixel value in the predetermined coordinate position;

an arithmetic unit calculating, as a feedback value in the predetermined coordinate position, a value obtained by multiplying the respective quantization errors in a predetermined area corresponding to the predetermined coordinate position with the set filter coefficient and adding up the quantization errors; and an adding unit adding the feedback value in the predetermined coordinate position to the corrected pixel value in the predetermined coordinate position.

15. A filter coefficient setting processing method for an image processing apparatus including a display apparatus, filter-coefficient storing unit storing filter coefficients respectively associated with spatial frequencies, which are numbers of strips displayed per unit angle with respect to an angle of field of a display apparatus, and a gradation modulating unit including a quantizing unit quantizing a pixel value in a predetermined coordinate position in a pixel signal and outputting the pixel value as a quantized pixel value in the predetermined coordinate position, the gradation modulating unit gradation-modulating the image signal by multiply-accumulating a set filter coefficient with respect to quantization errors caused by the quantizing unit to feed back the quantization errors to an input side of the quantizing unit, the method comprising the steps of:

determining, as viewing conditions, a viewing distance between a viewer and the display apparatus and pixel density of the display apparatus from screen information concerning the viewing conditions acquired from the display apparatus through communication with the display apparatus established by the image processing apparatus via an interface of the image processing apparatus, wherein, when a determination is the screen information is not acquired by the communication with the display apparatus, the viewing conditions are determined based on stored information corresponding to the screen information; and setting, in the gradation modulating unit, a filter coefficient selected on the basis of a spatial frequency calculated from the viewing conditions among the filter coefficients stored in the filter-coefficient storing unit.

16. A non-transitory storage medium on which is stored a computer program for causing a computer to execute, in an image processing apparatus including a display apparatus, a filter-coefficient storing unit storing filter coefficients respectively associated with spatial frequencies, which are numbers of strips displayed per unit angle with respect to an angle of field of a display apparatus, and a gradation modulating unit including a quantizing unit quantizing a pixel value in a predetermined coordinate position in a pixel signal and outputting the pixel value as a quantized pixel value in the predetermined coordinate position, the gradation modulating unit gradation-modulating the image signal by multiply-accumulating a set filter coefficient with respect to quantization errors caused by the quantizing unit to feed back the quantization errors to an input side of the quantizing unit:

a viewing-condition determining step of determining, as viewing conditions, a viewing distance between a viewer and the display apparatus and pixel density of the display apparatus from screen information concerning the viewing conditions acquired from the display apparatus through communication with the display apparatus established by the image processing apparatus via an interface of the image processing apparatus, wherein, when a determination is the screen information is not acquired by the communication with the display apparatus, the viewing conditions are determined by the view-condition determining step based on stored information corresponding to the screen information; and a filter-coefficient setting step of setting, in the gradation modulating unit, a filter coefficient selected on the basis of a spatial frequency calculated from the viewing conditions among the filter coefficients stored in the filter-coefficient storing unit.

* * * * *